US012717766B2

(12) United States Patent
Gass et al.

(10) Patent No.: US 12,717,766 B2
(45) Date of Patent: Aug. 25, 2026

(54) SYSTEMS AND METHODS FOR DATABASE ORIENTATION TRANSFORMATION

(71) Applicant: smartShift Technologies, Inc., Boston, MA (US)

(72) Inventors: Albrecht Gass, Fullerton, CA (US); Stefan Hetges, Mannheim (DE); Nikolaos Faradouris, Mannheim (DE); Oliver Flach, Leinfelden-Echterdingen (DE)

(73) Assignee: SMARTSHIFT TECHNOLOGIES, INC., Boston, MA (US)

( * ) Notice: Subject to any disclaimer, the term of this patent is extended or adjusted under 35 U.S.C. 154(b) by 0 days.

(21) Appl. No.: 18/114,971

(22) Filed: Feb. 27, 2023

(65) Prior Publication Data

US 2024/0045850 A1 Feb. 8, 2024

Related U.S. Application Data

(63) Continuation of application No. 15/012,435, filed on Feb. 1, 2016, now Pat. No. 11,593,342.

(51) Int. Cl.

*G06F 16/22* (2019.01)
*G06F 16/21* (2019.01)
*G06F 16/25* (2019.01)

(52) U.S. Cl.

CPC ........ *G06F 16/2282* (2019.01); *G06F 16/214* (2019.01); *G06F 16/221* (2019.01); *G06F 16/258* (2019.01)

(58) Field of Classification Search

CPC .. G06F 16/2282; G06F 16/214; G06F 16/221; G06F 16/258

See application file for complete search history.

(56) References Cited

U.S. PATENT DOCUMENTS 5,442,771 A 8/1995 Filepp et al.
5,574,898 A 11/1996 Leblang et al.
(Continued)

FOREIGN PATENT DOCUMENTS

DE 112015003587 T5 5/2017
WO 2001048601 A2 7/2001
(Continued)

OTHER PUBLICATIONS

Daniels, Thomas. "Transposing the rows and cols. of a 2D array, jagged array and string in C#", 2014 Available at: https://www.codeproject.com/Articles/793684/Transposing-the-rows-and-cols. of-array-CSharp (Year: 2014).*
(Continued)

*Primary Examiner* — Charles D Adams
(74) *Attorney, Agent, or Firm* — FisherBroyles, LLP; James J. Pohl

(57) ABSTRACT

The present application is directed towards systems and methods for automated analysis and transformation of databases and related applications and functions from a row-oriented syntax to a column-oriented syntax. An analyzer client executed by a processor of a client device may analyze a first database of a business management system comprising a plurality of arrays in a row-oriented syntax. A transformer executed by the processor may execute a first array of a second database having a column-oriented syntax. Iteratively, for each array of the plurality of arrays of the first database, the transformer may read an element at a first position of said array, and write the element to a next position of the first array of the second database.

20 Claims, 12 Drawing Sheets

(56) References Cited

U.S. PATENT DOCUMENTS 6,298,342 B1 * 10/2001 Graefe .................. G06F 16/284 707/718
6,367,077 B1 4/2002 Brodersen et al.
6,615,220 B1 9/2003 Austin et al.
6,802,056 B1 10/2004 Chaiken et al.
6,968,538 B2 11/2005 Rust et al.
7,051,319 B1 5/2006 Thorson et al.
7,076,778 B2 7/2006 Brodersen et al.
7,080,371 B1 7/2006 Arnaiz et al.
7,181,694 B2 2/2007 Reiss et al.
7,203,938 B2 4/2007 Ambrose et al.
7,240,327 B2 7/2007 Singh et al.
7,290,244 B2 10/2007 Peck et al.
7,305,671 B2 12/2007 Davidov et al.
7,310,653 B2 12/2007 Coyle et al.
7,356,802 B2 4/2008 De Sutter et al.
7,500,234 B2 3/2009 Hatasaki
7,516,447 B2 4/2009 Marvin et al.
7,536,686 B2 5/2009 Tan et al.
7,584,467 B2 9/2009 Wickham et al.
7,593,958 B2 9/2009 Bergstraesser et al.
7,614,006 B2 * 11/2009 Molander ............... G06F 40/18 715/764
7,669,188 B2 2/2010 Nickell et al.
7,700,680 B2 4/2010 Costanzi et al.
7,711,680 B2 5/2010 Barnes-Leon et al.
7,711,708 B2 5/2010 Bergstraesser et al.
7,784,045 B2 8/2010 Bowers
7,788,659 B1 8/2010 Rimlinger
7,802,246 B1 9/2010 Kennedy et al.
7,805,719 B2 9/2010 O'Neill
7,840,955 B1 11/2010 Weathersby et al.
7,865,874 B2 1/2011 Wookey
7,870,512 B2 1/2011 Misovski
7,895,592 B2 2/2011 Subramanian et al.
7,945,907 B2 5/2011 Dreiling et al.
8,020,146 B2 9/2011 Hudson, Jr.
8,060,857 B2 11/2011 Biggerstaff
8,091,081 B2 1/2012 Thorson et al.
8,091,082 B2 1/2012 Malik et al.
8,122,430 B2 2/2012 De Sutter et al.
8,132,150 B2 3/2012 De Sutter et al.
8,151,256 B2 4/2012 Ramannavar et al.
8,171,470 B2 5/2012 Goldman et al.
8,191,060 B2 5/2012 Malasky et al.
8,209,672 B2 6/2012 Ivanov
8,234,638 B2 7/2012 Bird
8,261,231 B1 9/2012 Hirsch et al.
8,261,256 B1 9/2012 Adler et al.
8,266,615 B2 9/2012 Shapiro
8,286,132 B2 10/2012 Yuan et al.
8,321,834 B2 11/2012 Baker et al.
8,327,351 B2 12/2012 Paladino et al.
8,387,022 B2 2/2013 Horning et al.
8,413,131 B2 4/2013 Bowers
8,423,502 B1 4/2013 Degany et al.
8,434,060 B2 4/2013 Driesen et al.
8,438,562 B2 5/2013 Sero et al.
8,448,161 B2 5/2013 Goldman
8,539,444 B2 9/2013 Cao et al.
8,572,566 B2 10/2013 Gass et al.
8,671,222 B2 3/2014 Gass et al.
8,706,771 B2 4/2014 Gass et al.
8,707,287 B2 4/2014 Raundahl Gregersen et al.
8,739,150 B2 5/2014 Gass et al.
8,898,627 B2 11/2014 Gass et al.
9,442,993 B2 9/2016 Tung et al.
9,633,317 B2 4/2017 Gabel et al.
9,811,325 B2 11/2017 Gass et al.
10,089,103 B2 10/2018 Gass et al.
10,095,734 B2 10/2018 Fontenot et al.
10,121,268 B2 11/2018 Baumecker
10,157,442 B1 12/2018 Mostak et al.
10,223,076 B1 3/2019 Owen et al.
10,248,409 B1 4/2019 Pohlack et al.
10,262,148 B2 4/2019 Cote
10,338,902 B1 7/2019 Sevigny
10,481,884 B2 11/2019 Gass et al.
10,515,121 B1 12/2019 Setlur et al.
10,528,343 B2 1/2020 Gass et al.
10,585,655 B2 3/2020 Gass et al.
10,698,674 B2 6/2020 Gass et al.
10,740,075 B2 8/2020 Gass et al.
10,740,287 B2 8/2020 Haviv et al.
10,795,660 B1 10/2020 Sundresh
11,099,823 B2 8/2021 Gass et al.
11,188,319 B2 11/2021 Gass et al.
11,429,365 B2 8/2022 Gass et al.
11,436,006 B2 9/2022 Gass et al.
11,593,342 B2 2/2023 Gass et al.
11,620,117 B2 4/2023 Gass et al.
11,726,760 B2 8/2023 Gass et al.
11,789,715 B2 10/2023 Gass et al.
12,379,908 B2 8/2025 Gass et al.
2002/0042849 A1 4/2002 Ho et al.
2002/0062475 A1 5/2002 Iborra et al.
2003/0028864 A1 2/2003 Bowen
2003/0058277 A1 3/2003 Bowman-Amuah
2003/0172368 A1 9/2003 Alumbaugh et al.
2004/0028864 A1 2/2004 Nelson
2004/0068715 A1 4/2004 Wong et al.
2004/0073900 A1 4/2004 Scott
2004/0252886 A1 12/2004 Pan et al.
2004/0268299 A1 12/2004 Lei et al.
2005/0010919 A1 1/2005 Ramanathan et al.
2005/0097146 A1 5/2005 Konstantinou et al.
2005/0120347 A1 6/2005 Asare et al.
2005/0177825 A1 8/2005 Kamalanathan
2005/0204340 A1 9/2005 Ruminer et al.
2005/0251797 A1 11/2005 Omiya et al.
2005/0257216 A1 11/2005 Cornell et al.
2005/0273705 A1 12/2005 Mccain
2006/0101452 A1 5/2006 Mak
2006/0123389 A1 6/2006 Kolawa et al.
2006/0129605 A1 6/2006 Doshi
2006/0130040 A1 6/2006 Subramanian et al.
2006/0242197 A1 10/2006 Tsyganskiy et al.
2006/0271528 A1 11/2006 Gorelik
2006/0277532 A1 12/2006 Barraclough et al.
2006/0288344 A1 12/2006 Brodersen et al.
2007/0061780 A1 3/2007 Pokluda et al.
2007/0136396 A1 6/2007 Kulkarni et al.
2007/0179939 A1 8/2007 O'Neil et al.
2007/0226728 A1 9/2007 Thorson et al.
2008/0028390 A1 1/2008 Fors et al.
2008/0082517 A1 4/2008 Sattler et al.
2008/0082972 A1 4/2008 De Sutter et al.
2008/0127123 A1 5/2008 Sattler et al.
2008/0228770 A1 9/2008 Halcrow et al.
2008/0256515 A1 10/2008 Ponce de Leon
2008/0295069 A1 11/2008 Nicholls et al.
2009/0019426 A1 1/2009 Baeumer et al.
2009/0070734 A1 3/2009 Dixon et al.
2009/0150866 A1 6/2009 Schmidt
2009/0172637 A1 7/2009 Parikh
2009/0235232 A1 9/2009 Malik et al.
2009/0300579 A1 12/2009 Dutta et al.
2009/0313601 A1 12/2009 Baird et al.
2010/0082386 A1 4/2010 Cao et al.
2010/0082407 A1 4/2010 Akkiraju et al.
2011/0077958 A1 3/2011 Breitenstein et al.
2011/0078211 A1 3/2011 Gass et al.
2011/0078667 A1 3/2011 Dolby et al.
2011/0107103 A1 5/2011 Dehaan et al.
2011/0161952 A1 6/2011 Poddar et al.
2011/0219361 A1 9/2011 Dolby et al.
2011/0225575 A1 9/2011 Ningombam et al.
2011/0282995 A1 11/2011 Gass et al.
2011/0283256 A1 11/2011 Raundahl Gregersen et al.
2011/0283269 A1 11/2011 Gass et al.
2011/0283270 A1 11/2011 Gass et al.
2011/0296391 A1 12/2011 Gass et al.
2011/0302563 A1 12/2011 Li
2012/0102451 A1 4/2012 Kulkarni et al.

(56) References Cited

U.S. PATENT DOCUMENTS

2012/0167036 A1 6/2012 Tanaka et al.
2012/0173515 A1 7/2012 Jeong et al.
2012/0192143 A1 7/2012 Elaasar
2012/0246170 A1 9/2012 Tantorno
2012/0254113 A1 10/2012 Theroux et al.
2012/0265727 A1 10/2012 Naryzhnyy et al.
2012/0284389 A1 11/2012 Azagury et al.
2013/0013248 A1 1/2013 Brugler et al.
2013/0060507 A1 3/2013 Kianovski et al.
2013/0239098 A1 9/2013 Ichii et al.
2013/0268916 A1 10/2013 Misra et al.
2013/0268927 A1 10/2013 Cochran
2013/0283106 A1 10/2013 King et al.
2014/0130036 A1 5/2014 Gurikar et al.
2014/0173561 A1 6/2014 Toub
2014/0208316 A1 7/2014 Ciano et al.
2014/0215446 A1 7/2014 Araya et al.
2014/0281247 A1* 9/2014 Loaiza ............. G06F 16/24552 711/126
2014/0282466 A1 9/2014 Feldman et al.
2015/0070379 A1 3/2015 Fan et al.
2015/0082296 A1 3/2015 Thomas et al.
2015/0143339 A1 5/2015 Rajanna et al.
2015/0169683 A1* 6/2015 Chandramouli .... G06F 16/2477 707/713
2015/0205705 A1 7/2015 Yates
2015/0234642 A1 8/2015 Araya et al.
2015/0278110 A1 10/2015 Gshwind
2015/0339119 A1 11/2015 Rehman et al.
2015/0348294 A1 12/2015 Sridharan et al.
2015/0363294 A1 12/2015 Carback, III et al.
2016/0041816 A1 2/2016 Yang et al.
2016/0062753 A1 3/2016 Champagne
2016/0092204 A1 3/2016 Katkere et al.
2016/0124966 A1 5/2016 Cohen
2016/0170745 A1 6/2016 Best
2016/0275159 A1 9/2016 Jarvie et al.
2016/0321307 A1 11/2016 Dingman et al.
2016/0335278 A1 11/2016 Tabaaloute et al.
2016/0371351 A1 12/2016 Kura et al.
2016/0378445 A1 12/2016 Kashiwagi et al.
2017/0017475 A1 1/2017 Tabaru
2017/0039372 A1 2/2017 Koval et al.
2017/0046143 A1 2/2017 Kochhar et al.
2017/0060540 A1 3/2017 Allen et al.
2017/0083572 A1 3/2017 Tankersley et al.
2017/0090916 A1 3/2017 Nishikawa et al.
2017/0131872 A1 5/2017 Husain
2017/0139705 A1 5/2017 Grisa et al.
2017/0139952 A1 5/2017 Arasan et al.
2017/0147324 A1 5/2017 Weber et al.
2017/0147681 A1 5/2017 Tankersley et al.
2017/0242671 A1 8/2017 Edler Von Koch et al.
2017/0293668 A1 10/2017 Crabtree et al.
2017/0300206 A1 10/2017 Rosinko et al.
2017/0300306 A1 10/2017 De et al.
2017/0308372 A1 10/2017 Thomas et al.
2018/0075042 A1 3/2018 Cruz et al.
2018/0081650 A1 3/2018 Larin et al.
2018/0088936 A1 3/2018 Tanimoto et al.
2018/0096053 A1 4/2018 Panwar et al.
2018/0150528 A1 5/2018 Shah et al.
2018/0232227 A1 8/2018 Deol et al.
2018/0246703 A1 8/2018 Ren et al.
2018/0247235 A1 8/2018 Williger et al.
2018/0336018 A1 11/2018 Lu et al.
2018/0349105 A1 12/2018 Makkar
2018/0352218 A1 12/2018 Abe
2018/0357051 A1 12/2018 Puszkiewicz
2018/0373504 A1 12/2018 Chatty et al.
2018/0373509 A1 12/2018 Zhang
2019/0043231 A1 2/2019 Uzgin et al.
2019/0050463 A1 2/2019 Goradia et al.
2019/0079754 A1 3/2019 Makkar
2019/0138428 A1 5/2019 Sumitomo et al.
2019/0171438 A1 6/2019 Franchitti
2019/0279402 A1 9/2019 Panetta et al.
2019/0391791 A1 12/2019 Bebee et al.
2020/0334021 A1 10/2020 Bucuvalas et al.

FOREIGN PATENT DOCUMENTS

WO 2011041246 A1 4/2011
WO 2012017757 A1 2/2012
WO 2014130733 A1 8/2014

OTHER PUBLICATIONS

Xu et al., “Data-Driven Shape Analysis and Processing”, 2016, pp. 1-38, https://dl.acm.org/doi/pdf/10.1145/2988458.2988473.
Bedini et al., “Transforming XML Schema to OWL Using Patterns”, 2011, IEEE, pp. 102-109, DOI: 10.1109/ICSC.2011.77.
Bourgeois et al., “Extending Executability of Applications on Varied Target Platforms”, IEEE International Conference on High Performance Computing and Communications, 2011, pp. 253-260.
Buschle et al., “Automating Enterprise Architecture Documentation using an Enterprise Service Bus”, Aug. 2012, Americas Conference on Information Systems (AMCIS), 16 pages.
Carbone et al., “Mapping Kernel Objects to Enable Systematic Integrity Checking”, 2009, ACM.
Detten et al, “Combining Clustering and Pattern Detection for the Reengineering of Component-based Software Systems” ACM, 2011, pp. 23-32.
Dimitroulakos et al., “A Source-To-Source Compiler for Dynamic Code Analysis and Loop Transformations”, 2012, pp. 1-2.
Fischer et al., “Engage: A Deployment Management System”, Jun. 2012, ACM, pp. 263-273.
Gabriel et al., “Conscientious Software”, ACM, Oct. 2006, pp. 433-450.
Girardi et al, “An Ontology-based Knowledge Base for the Representation and Reuse of Software Patterns”, ACM SIGSOFT, 2006, pp. 1-6, vol. 31, No. 1.
Heydon et al., “The Vesta Approach to Software Configuraitn Management”, 1999, pp. 1-10.
Janjusic et al., “Trace Driven Data Structure Transformations”, IEEE, 2012, pp. 456-464.
Kobayashi et al., “Object-Oriented Modeling of Software Patterns” IEEE, 2001, pp. 100-109.
Kodhai et al., “Detecting and Investigating the Source Code Changes using Logical rules”, 2014, pp. 1603-1608.
Kuhfeld, “Heat Maps: Graphically Displaying Big Data and Small Tables”, 2017, pp. 1-20.
Lattner et al., “LLVM: A Compilation Framework for Lifelong Program Analysis & Transformation”, International Symposium on Code Generation and Optimization, 2004, pp. 1-12.
Ledur et al., “Towards a Domain-Specific Language for Geospatial Data Visualization Maps with Big Data Sets”, 2015, pp. 1-8.
Lewandowski, “Frameworks for Compuonent-Based Client/Server Computing”, ACM Computing Surveys, Mar. 1998, pp. 3-27, vol. 30, No. 1.
Lin et al., An Empirical Study on the Characteristics of Python Fine-Grained Source Code Change Types, 2016, IEEE, pp. 188-199, DOI: 10.1109/ICSME.2016.25.
Martins et al., “A Clustering-Based Approach for Exploring Sequences of Compiler Optimizations”, 2014, pp. 2436-2443.
Martins et al., “Clustering-Based Selection for the Exploration of Compiler Optimization Sequences”, ACM Transactions on Architecture and Code Optimization, Mar. 2016, 28 pages, vol. 13, No. 1, Article 8.
Phankokkruad, “Classification of File Duplication by Hierarchical Clustering Based on Similarity Relations”, IEEE, 2017, pp. 1598-1563.
Rolim et al., “Learning Syntactic Program Transformations from Examples”, 2017, pp. 1-12.
Schanne et al., “Adding Autonomic Functionality to Object-Oriented Applications”, 6 pages.
Schindler et al., “Clustering Source Code Elements by Semantic Similarity Using Wikipedia”, 2015 IEEE/ACM 4th International

(56) References Cited

OTHER PUBLICATIONS

Workshop on Realizing AI Synergies in Software Engineering, 6 pages, DOI 10.1109/RAISE.2015.10.
Sethi et al., "Rapid Deployment of SOA Solutions via Automated Image Replication and Reconfiguration", 2008, IEEE, 8 pages.
Siddiqui et al, "GLARE: A Grid Activity Registration, Deployment and Provisioning Framework", ACM, 2005, 12 pages.
Siegel, "Automatic Configuratin of Dynamically Alterable Object Oriented Systems"; IEEE, 1993, pp. 158-161.
Stepan, "Design Pattern Solutions as Explicit Entities in Component-based Software Development", ACM, Jun. 2011, pp. 9-16.
Vetterli et al., "Metadata Standards for Data Warehousing: Open Information Model vs. Common Warehouse Metamodel", ACM, Sep. 2000, 8 pages.
Ward et al., "Workload Migration into Clouds—Challenges, Experiences, Opportunities", 2010, IEEE, pp. 164-171, DOI: 10.1109/CLOUD.2010.84.
Ye et al., "Providing Access Control through Program Transformation", IEEE, 2011, pp. 12-17, DOI: 10.1109/PDCAT.2011.71.
Zhengong et al., "A Pattern-Based Code Transformation Approach for Cloud Application Migration", IEEE 8th International Conference on Cloud Computing, 2015, pp. 33-40.
Zhong et al., "The Application of K-Means Clustering Algorithm Based on Hadoop", IEEE, 2016, pp. 88-92.
Ashish, Aveg, "Clones Clustering Using K-Means", 2016, pp. 1-6 https://ieeexplore.ieee.org/stamp/stamp.jsp?tp=&arnumber=7726943.
Beller et al., "Analyzing the State of Static Analysis: A Large-Scale Evaluation in Open Source Software", 2016, pp. 1-12, https://ieeexplore.ieee.org/stamp/stamp.jsp?tp=&arnumber=7476667.
Forite et al., "FASMM: Fast and Accessible Software Migration Method", 12 pages.
Zapata et al., "How to Speed Up Software Migration and Modernization: Successful Strategies Developed by Precisiating Expert Knowledge", 2015, 6 pages, https://ieeexplore.ieee.org/stamp/stamp.jsp?tp=&arnumber=7284166.
El-Ramly et al., "An Experiment in Automatic Conversion of Legacy Java Programs to C#", IEEE Xplore, 2006, pp. 1037-1045, https://ieeexplore. ieee.org/stamp/stamp.jsp?tp=&arnumber= 1618480.
Ma et al., "Advanced Screen Content Coding Using Color Table and Index Map", IEEE Xplore, 2014, pp. 4399-4411, vol. 23, No. 10, https://ieeexplore.ieee.org/stamp/stamp.jsp?tp=&amumber=6876209.

* cited by examiner

Array 410A
Element 1 402A
Element 1 402B
Element 1 402C
Array 410B
Element 2 404A
Element 2 404B
Element 2 404C
Array 410C
Element 3 406A
Element 3 406B
Element 3 406C
Array 410N
Element n 408A
Element n 408B
Element n 408C
Element 1 402N
Element 2 404N
Element 3 406N
Element n 408N
414

SYSTEMS AND METHODS FOR DATABASE ORIENTATION TRANSFORMATION

FIELD OF THE DISCLOSURE

The present application generally relates to analyzing, upgrading, and modernizing an application. In particular, the present application relates to systems and methods for automatically replacing code constructs and functions with appropriate mappings and/or retaining parameter mapping for use in reorientation of databases from a row-based structure to a column-based structure.

BACKGROUND OF THE DISCLOSURE

Many software applications may be modified or customized by users or administrators to include additional functions, objects, databases, and customized code. When the underlying software application is upgraded to a new version, in many instances, the modified or customized functions, objects, databases, and code of the prior, obsolete version may be incompatible with the new version. Rewriting the modified or customized functions, objects, databases, and/or code may be time consuming and expensive.

BRIEF DESCRIPTION OF THE FIGURES

The details, objects, aspects, features, and advantages of various embodiments of the invention are set forth in the description below and accompanying drawings, in which.

Figure 1A:
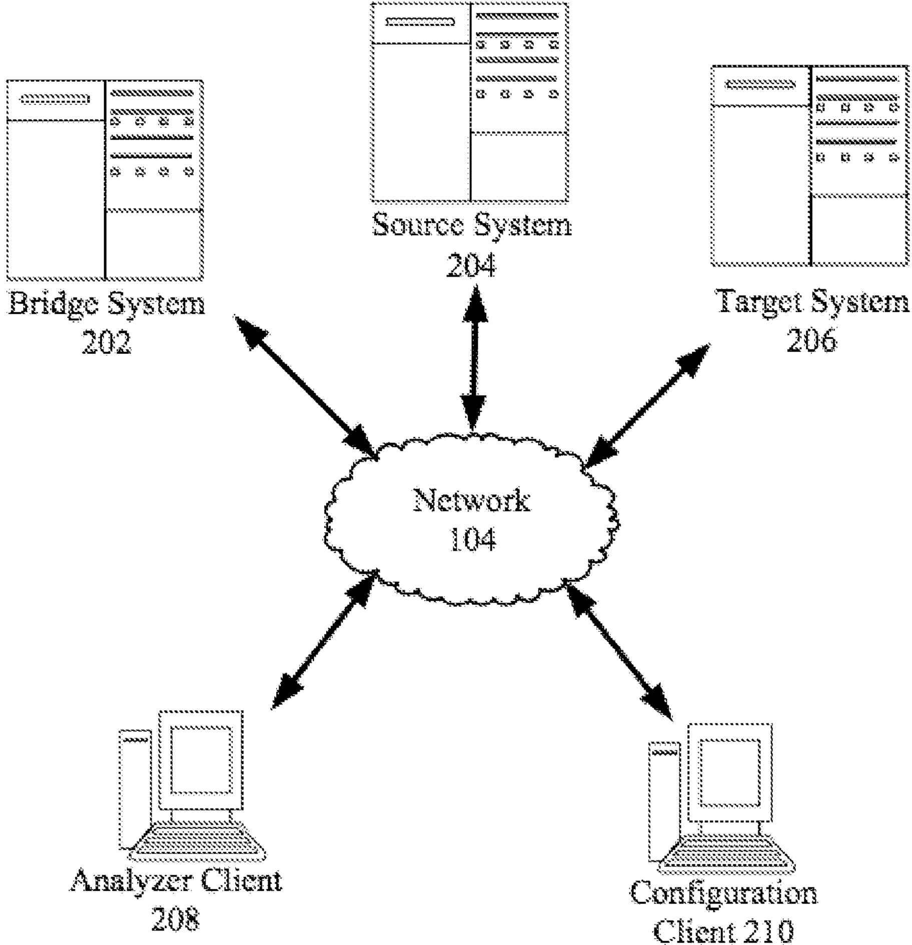
FIG. 1A is a block diagram of an embodiment of a network environment for a client to access a server for analyzing and transforming an application from a source installation to a target installation.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present application is directed towards systems and methods for dynamically modifying code and applications from a row-oriented paradigm or syntax to a column-oriented paradigm or syntax. The class of software systems and corresponding market segment referred to as Enterprise Resource Planning (ERP) is characterized by systems and applications of extremely large breadth and scope of functionality, designed to coordinate, control, and support resources and information related to business processes such as manufacturing, supply chain management, financials, projects, human resources and customer relationship management from a shared data store for an entire enterprise. The inherently large scope and complexity of ERP systems poses significant challenges to modernization. Business owners must balance significant business and technical benefits of updating and modernizing these vast systems against the considerable costs, risks, and disruption associated with large-scale modernization projections.

One example of an ERP system is the Systems, Applications, and Products (SAP) system developed by SAP AG of Walldorf, Germany. SAP uses a proprietary system architecture and programming language, the Advanced Business Application Programming (ABAP) language, which includes the concept of Logical Databases (LDBs). SAP is prominent in the market, and this has spawned an industry sub-niche for providers of specialized services and solutions related to SAP systems. Services and solutions serving the SAP ERP market segment must be extremely knowledgeable about, and closely aligned with, the underlying framework, architecture, and programming language of SAP systems, from both technical and business perspectives. The SAP ERP environment allows customers and consultants to develop customized code, objects, reports, and interfaces for specific business requirements.

Figures 4A, 4B:
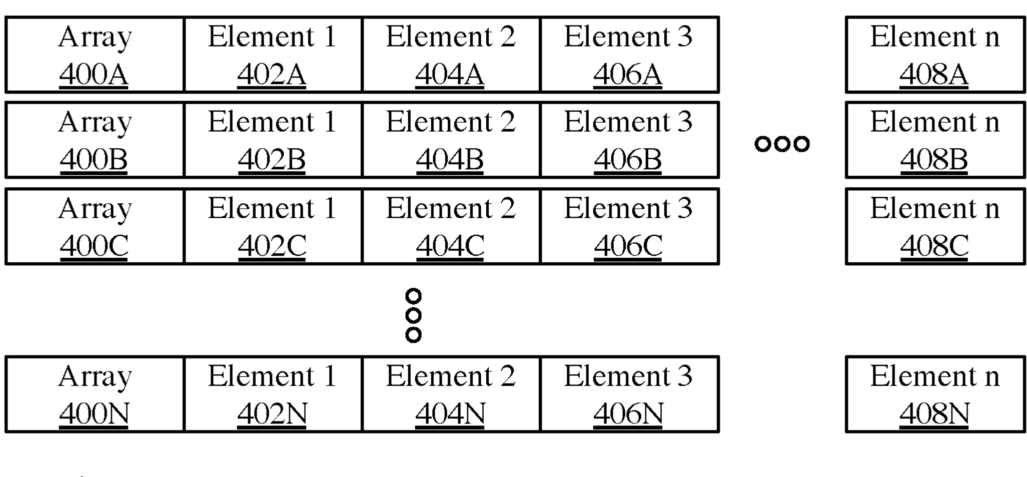
FIGS. 4A-B are illustrations of databases in row orientation and column orientation, respectively.

Traditional ERP systems have been implemented with row-oriented databases and tables. Referring first to FIG. 4A, illustrated is an implementation of a row-oriented database 412. Database 412 may comprise a data table, array, flat file, or any other type and form of data structure. Database 412 may comprise a plurality of elements 402A-408N, referred to generally as elements 402-408, which may be of any type and form of data, including heterogeneous types of data.

Row-oriented data structures, such as database 412, may be characterized by their storage of elements 402-408 in arrays 400A-400N (referred to generally as arrays 400 or horizontal- or row-based arrays 400) of contiguous data blocks. Specifically, as shown, a database 412 may comprise a first array 400A, storing a plurality of elements 402A-408A; a second array 400B, storing a plurality of elements 402B-408B; etc. One example of such a data structure is a comma-separated value file, with elements in each row separated by commas, and rows separated by line breaks or carriage returns.

Row-oriented data structures such as database 412 are traditional and reflect typical line by line language systems. However, in practice, data is frequently related and processed by columns. For example, a typical accounts receivable database for a company may include a row for each customer with, among others, a first column identifying a customer name; a second column identifying an invoice date; and a third column identifying a current balance. A typical function performed on such a database may include calculating a sum of outstanding invoices by tallying the numbers in the third column. Such a function, such as calculating a sum of elements 406A-406N of database 412, requires a series of read operations to be performed on each array 400A-400N separately. As elements 406A-406N are not stored contiguously, these repeated read operations may slow processing time, for example due to access time of magnetic or optical storage.

By contrast, and referring now to FIG. 4B, illustrated is an example of a column-oriented database 414. Data elements 402A-402N through 408A-408N are stored contiguously in column-oriented arrays 410A-410N. Calculating a sum of elements in a column of data requires access to only a single array, and may be performed efficiently in a single process.

In practice, operations are more frequently performed on columns of similar elements than on rows of dissimilar elements. Accordingly, column-oriented databases may provide significant efficiency gains over row-oriented databases. While creating new implementations of column-oriented databases and related applications and functions may be relatively easy, upgrading existing systems built on a row-oriented syntax may be more complicated, typically requiring significant manual rewriting of applications. In some aspects, the present disclosure is directed to systems and methods for automated analysis and transformation of these applications and databases from a row-oriented syntax to a column-oriented syntax, including analyzing and extracting data and code, re-orienting the data and rewriting read and select operations, and optimizing the code for better performance.

For purposes of reading the description of the various embodiments below, the following descriptions of the sections of the specification and their respective contents may be helpful:

- Section A describes a network environment and computing environment which may be useful for practicing embodiments described herein;
- Section B describes embodiments of systems and methods for analyzing and transforming an application from a source installation to a target installation; and
- Section C describes embodiments of systems and methods for dynamically modifying code and data from a row-oriented syntax to a column-oriented syntax.

A. Network and Computing Environment

Prior to discussing the specifics of embodiments of the systems and methods of the solution of the present disclosure, it may be helpful to discuss the network and computing environments in which such embodiments may be deployed. Referring now to FIG. 1A, an embodiment of a network environment 101 is depicted. In brief overview, the network environment 101 comprises one or more systems 202-206 in communication with one or more clients 208-210 (also generally referred to as remote machine(s) 106) via one or more networks 104. Specifically shown are a bridge system 202, a source system 204, a target system 206, an analyzer client 208, and a configuration client 210. In some embodiments, analyzer client 208 and configuration client 210 may be the same client. In other embodiments, bridge system 202 may be combined with analyzer client 208 and/or configuration client 210. In yet another embodiment, bridge system 202 may be combined with either source system 204 or target system 206. In some embodiments, a client 208-210 communicates with a server 202-206 via an intermediary appliance (not shown), such as a firewall, a switch, a hub, a NAT, a proxy, a performance enhancing proxy, a network accelerator, a modem, or other network device of any form or type.

As shown in FIG. 1A, the network 104 can be a local-area network (LAN), such as a company Intranet, a metropolitan area network (MAN), or a wide area network (WAN), such as the Internet or the World Wide Web. Although not illustrated, network 104 may comprise one or more networks, coupled either directly or via one or more intermediaries. In one embodiment, network 104 may be a private network. In another embodiment, network 104 may be a public network. In some embodiments, network 104 may be a combination of one or more private networks and one or more public networks. In some embodiments, clients 208-210 may be located at a branch office of a corporate enterprise communicating via a WAN connection over the network 104 to the systems 202-206 located at a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As shown in FIG. 1A, bridge system 202 may be a server or workstation, configured to include a solution manager 212 and/or a collection agent 214, discussed in more detail below. As discussed above, although illustrated as a separate entity, bridge system 202 may be part of or combined with either or both of analyzer client 208 and configuration client 210.

Source system 204 may also be referred to as a source installation 204. In some embodiments, source system or source installation 204 may comprise a server or workstation with an installation or configuration of a version of one or more applications. In one embodiment, the one or more applications may also include an operating system. In another embodiment, the one or more applications may comprise an enterprise resource planning (ERP) software, such as SAP Business Suite, SAP R/3, or SAP High-Performance Analytic Appliance (HANA), manufactured by SAP AG of Walldorf, Germany; Microsoft Dynamics, manufactured by Microsoft Corporation of Redmond, Washington; PeopleSoft, manufactured by Oracle Corporation of Redwood Shores, California; or any other type and form of enterprise or manufacturing resource planning software. In another embodiment, the one or more applications may comprise any application that comprises an installation in a predetermined state, and modifications to objects from the predetermined state. In an example of such an embodiment, a default installation of an ERP application may be installed on source installation 204. To account for specific needs of the business or industry, the installation may be modified, with custom objects, code, or functions for performing additional tasks or managing additional resources not foreseen by the manufacturer of the ERP application. In another embodiment, the source system or source installation may comprise any type or form of application containing modifications from an initial or default state.

An installation in a predetermined state may comprise any type and form of version, installation and/or state of configuration, modernization or customization of the same at any point during development, deployment or maintenance of the application. In some embodiments, the predetermined state may be an initial or default installation of an application. In some embodiments, the predetermined state may be the initial or default installation of a version of an application with a set of one or more configurations, customizations or extensions. In some embodiments, the predetermined state may be any version of an application with a set of one or more configurations, customizations or extensions. In other embodiments, the predetermined state may be any version that has been upgraded or transformed using any of the systems and methods described herein. In some embodiments, the predetermined state may be any point of configuration or customization of a version of an application, whether complete, in-process or otherwise. For example, a predetermined state of an application may be any set point in development, configuration or customization of an application. For example, the systems and methods described herein may be used to transform the configuration or customization during the development phases before the final customizations or configurations are deployed for production.

Target system 206 may also be referred to as a target installation 206. In some embodiments, target system or target installation 206 may comprise a server or workstation with an installation or configuration of a second version of one or more applications. In some embodiments, the second version may be similar to the first version of one or more applications on source system 204. As described above, source system 204 may comprise custom objects, codes or functions. Using the methods and systems described herein, target system 206 may be efficiently modified to comprise the custom objects, codes or functions of source system 204. In some embodiments, target system 206 may comprise additional modifications to allow the custom objects, codes or functions to execute or interact properly with the second version of the one or more applications. For example, a company with an existing source system 204 may wish to upgrade to a new version of an underlying application on a target system 206. The existing source system 204 may have modifications and custom objects that the company wishes to include on target system 206. In some embodiments, custom objects and code may be directly transferred and will perform without error on target system 206. However, in many embodiments, the custom objects and code may need further modifications, due to differences between the underlying application of target system 206 and source system 204.

Also shown in FIG. 1A are analyzer client 208 and configuration client 210. Although shown as separate clients, in some embodiments, analyzer client 208 and configuration client 210 may be combined, and/or may be combined with bridge system 202. Analyzer client 208 and configuration client 210 may each be a workstation, client, or server. In some embodiments, analyzer client 208 is configured with or executes an analysis agent 228 and/or transformer 230, described in more detail below. In some embodiments, configuration client 210 is configured with or executes a configuration agent 232 and/or a manual conversion agent 234, described in more detail below.

The bridge system 202, source system 204, target system 206, analyzer client 208 and configuration client 210 may be deployed as and/or executed on any type and form of computing device, such as a computer, network device or appliance capable of communicating on any type and form of network and performing the operations described herein. Furthermore, although only one each of systems 202-210 are illustrated, in many embodiments, the systems may each comprise one or more physical and/or virtual machines, such as a server cloud, server farm, cloud of virtual machines executed by one or more physical machines, etc.

Figure 1B:
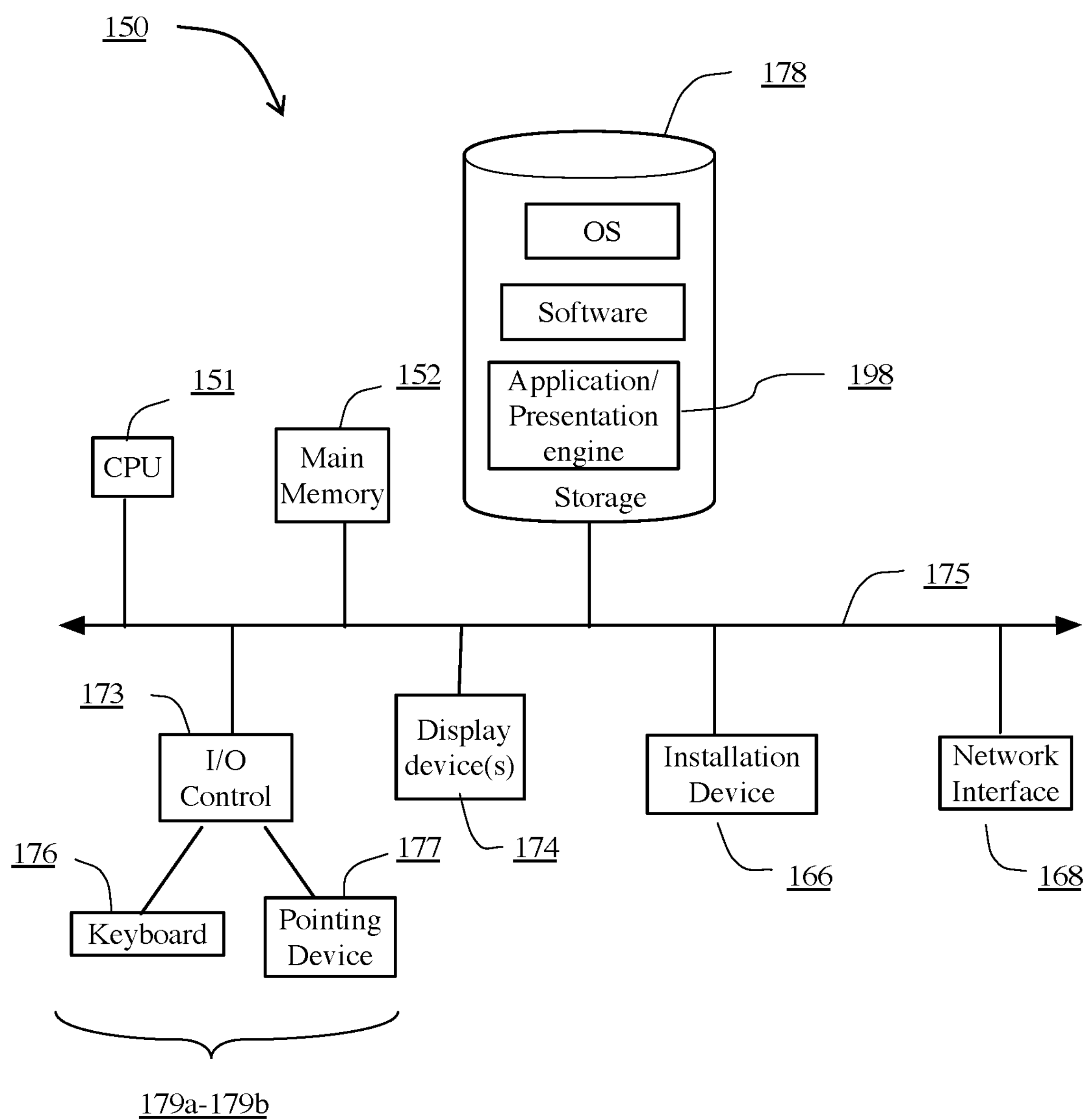
FIG. 1B is a block diagram of an embodiment of a computing device.

FIG. 1B is a block diagram of an exemplary computing device useful for practicing the methods and systems described herein. The various devices and servers may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 1B depicts a block diagram of a computing device 150 useful for practicing an embodiment of the bridge system 202, source system 204, target system 206, analyzer client 208, or configuration client 210. A computing device 150 may include a central processing unit 151; a main memory unit 152; a visual display device 174; one or more input/output devices 179*a*-179*b* (generally referred to using reference numeral 179), such as a keyboard 176, which may be a virtual keyboard or a physical keyboard, and/or a pointing device 177, such as a mouse, touchpad, or capacitive or resistive single- or multi-touch input device; and a cache memory (not illustrated) in communication with the central processing unit 151, which may be connected via a bus 175.

The central processing unit 151 is any logic circuitry that responds to and processes instructions fetched from the main memory unit 152 and/or storage 178. The central processing unit may be provided by a microprocessor unit, such as: those manufactured by Intel Corporation of Santa Clara, California; those manufactured by Motorola Corporation of Schaumburg, Illinois; those manufactured by Apple Inc. of Cupertino California, or any other single- or multi-core processor, or any other processor capable of operating as described herein, or a combination of two or more single- or multi-core processors. Main memory unit 152 may be one or more memory chips capable of storing data and allowing any storage location to be directly accessed by the microprocessor 151, such as random access memory (RAM) of any type. In some embodiments, main memory unit 152 may include cache memory or other types of memory.

The computing device 150 may support any suitable installation device 166, such as a floppy disk drive, a CD-ROM drive, a CD-R/RW drive, a DVD-ROM drive, tape drives of various formats, USB/Flash devices, a hard-drive or any other device suitable for installing software and programs such as a social media application or presentation engine, or portion thereof. The computing device 150 may further comprise a storage device 178, such as one or more hard disk drives or redundant arrays of independent disks, for storing an operating system and other related software, and for storing application software programs such as any program related to the social media application or presentation engine.

Furthermore, the computing device 150 may include a network interface 168 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 168 may comprise a built-in network adapter, network interface card, PCMCIA network card, card bus network adapter, wireless network adapter, USB network adapter, cellular modem or any other device suitable for interfacing the computing device 150 to any type of network capable of communication and performing the operations described herein.

A wide variety of I/O devices 179*a*-179*n* may be present in the computing device 150. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 179 may be controlled by an I/O controller 173 as shown in FIG. 1B. The I/O controller may control one or more I/O devices such as a keyboard 176 and a pointing device 177, e.g., a mouse, optical pen, or multi-touch screen. Furthermore, an I/O device may also provide storage 178 and/or an installation medium 166 for the computing device 150. The computing device 150 may provide USB connections to receive handheld USB storage devices such as the USB Flash Drive line of devices manufactured by Twintech Industry, Inc. of Los Alamitos, California.

The computing device 150 may comprise or be connected to multiple display devices 174*a*-174*n*, which each may be of the same or different type and/or form. As such, any of the I/O devices 179*a*-179*n* and/or the I/O controller 173 may comprise any type and/or form of suitable hardware, software embodied on a tangible medium, or combination of hardware and software to support, enable or provide for the connection and use of multiple display devices 174*a*-174*n* by the computing device 150. For example, the computing device 150 may include any type and/or form of video adapter, video card, driver, and/or library to interface, communicate, connect or otherwise use the display devices 174*a*-174*n*. A video adapter may comprise multiple connectors to interface to multiple display devices 174*a*-174*n*. The computing device 150 may include multiple video adapters, with each video adapter connected to one or more of the display devices 174*a*-174*n*. Any portion of the operating system of the computing device 150 may be configured for using multiple displays 174*a*-174*n*. Additionally, one or more of the display devices 174*a*-174*n* may be provided by one or more other computing devices, such as computing devices 150*a* and 150*b* connected to the computing device 150, for example, via a network. These embodiments may include any type of software embodied on a tangible medium designed and constructed to use another computer's display device as a second display device 174*a* for the computing device 150. One ordinarily skilled in the art will recognize and appreciate the various ways and embodiments that a computing device 150 may be configured to have multiple display devices 174*a*-174*n*.

A computing device 150 of the sort depicted in FIG. 1B typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 150 may have different processors, operating systems, and input devices consistent with the device. For example, in one embodiment, the computer 150 is an Apple iPhone or Motorola Droid smart phone, or an Apple iPad or Samsung Galaxy Tab tablet computer, incorporating multi-input touch screens. Moreover, the computing device 150 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, a first computing device 100*a* executes an application on behalf of a user of a client computing device 100*b*. In other embodiments, a computing device 100*a* executes a virtual machine, which provides an execution session within which applications execute on behalf of a user or a client computing devices 100*b*. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2A:
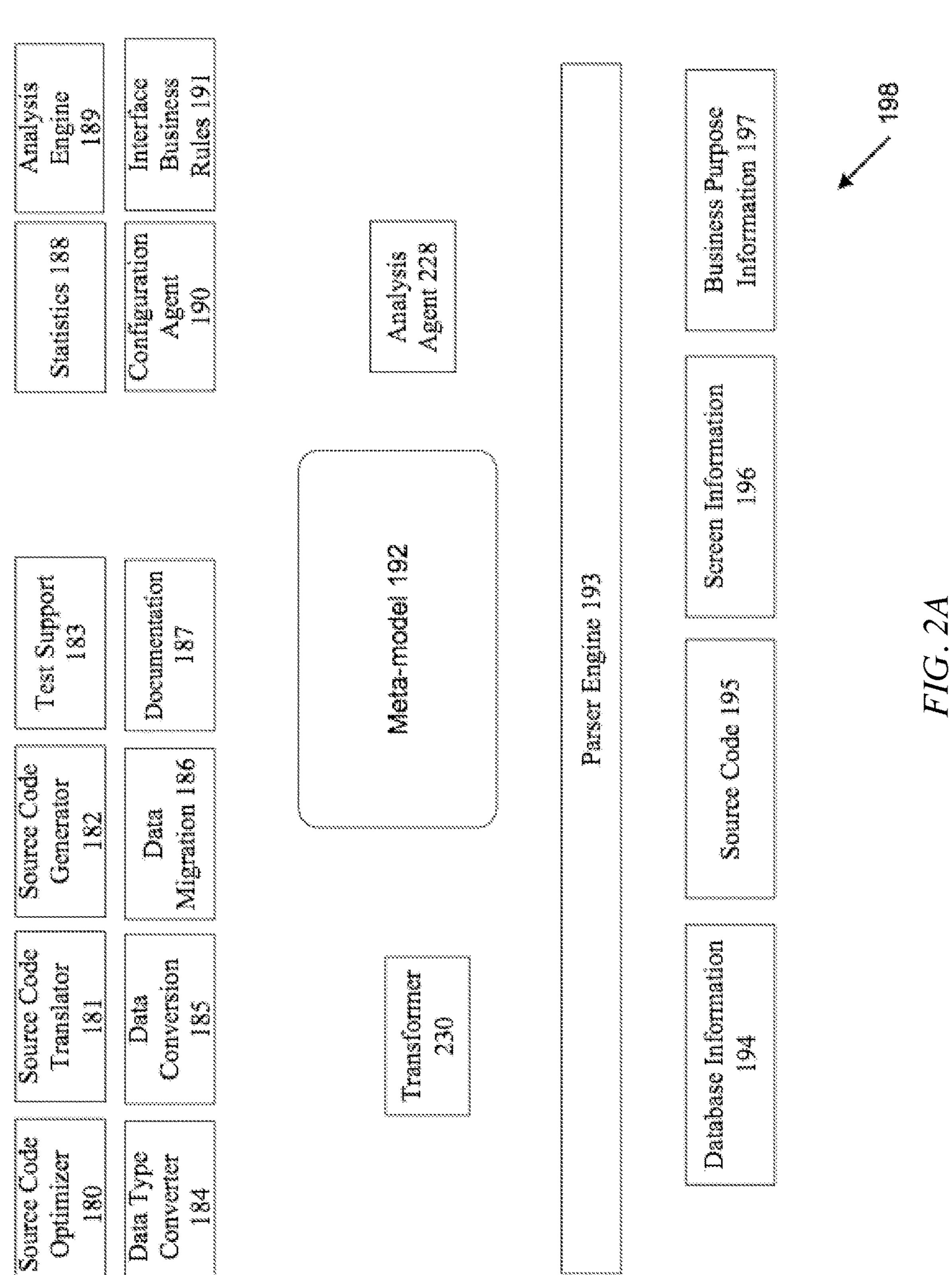
FIG. 2A is a block diagram of an embodiment of a suite of applications for analyzing and transforming an application from a source installation to a target installation.

B. Systems and Methods for Analyzing and Transforming an Application from a Source Installation to a Target Installation FIG. 2A illustrates a block diagram of an embodiment of a suite of applications and data types for analyzing and transforming an application from a source installation to a target installation. In brief, FIG. 2A shows a source code optimizer 180, source code translator 181, source code generator 182, test support engine 183, a data type converter 184, agents for data conversion 185 and data migration 186, and documentation 187. Together, blocks 180-187 comprise agents of transformer 230. Similarly, statistics data 188, analysis engine 189, configuration agent 190 and interface business rules 191 comprise agents of analysis agent 228. Meta-model 192 interacts with both the analysis agent 228 and transformer 230, and is established by parser engine 193. Additional data types are available, such as database information 194, source code 195, screen information 196, and business purpose information 197.

Figure 2B:
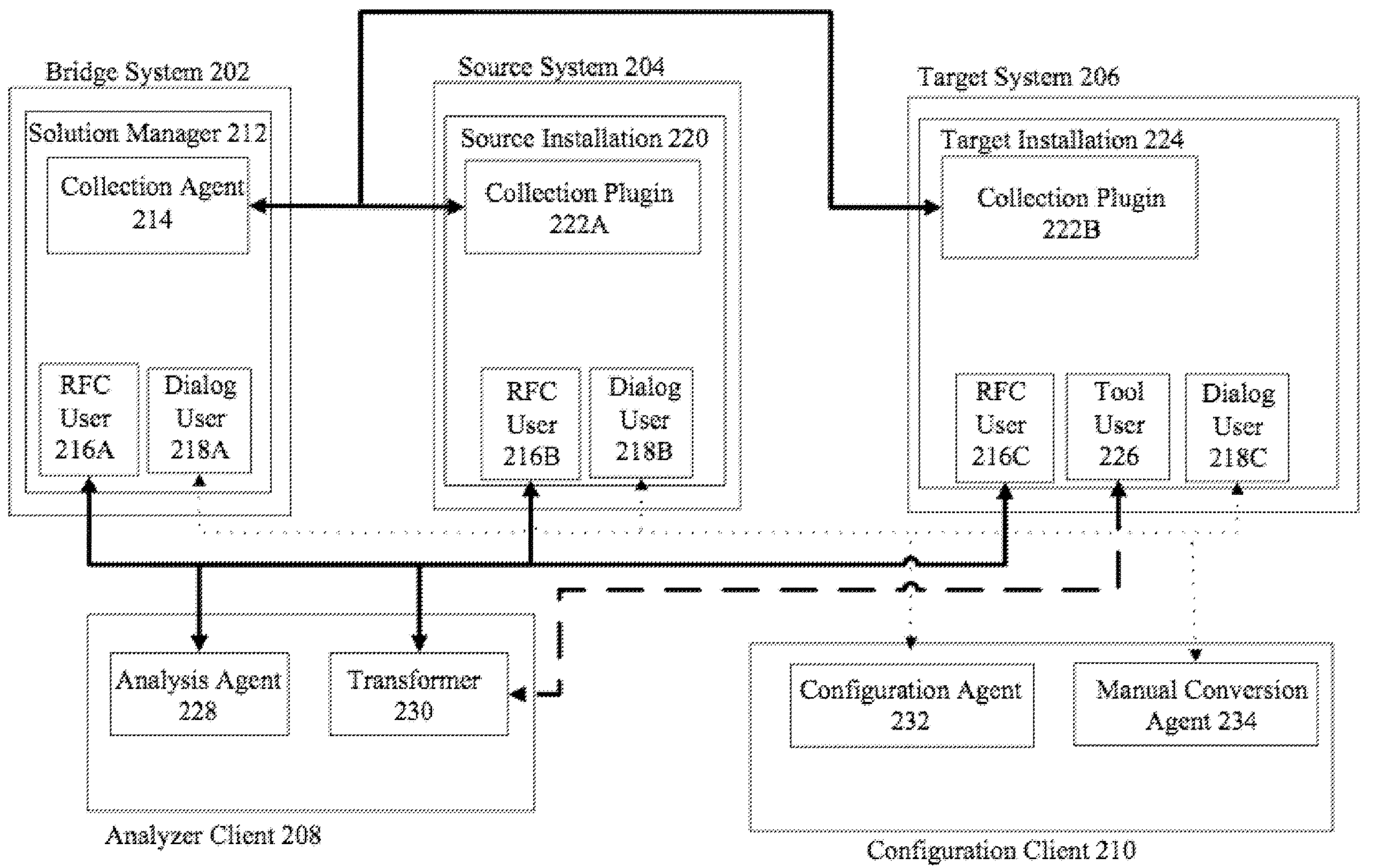
FIG. 2B is a block diagram of an embodiment of an appliance for analyzing and transforming an application from a source installation to a target installation.

Shown in FIG. 2B is a block diagram of another embodiment of a system for analyzing and transforming an application from a source installation to a target installation. In brief, bridge system 202 may be configured with a solution manager 212, which may include a collection agent 214 and may be configured with a remote function call (RFC) user account 216A and a dialog user account 218A. Source system 204 may be configured with a source installation 220, which may include a collection plug-in 222A. Source installation 220 may also be configured with an RFC user account 216B and a dialog user account 218B. Target system 206 may be configured with a target installation 224, which may include a collection plug-in 222B. Target installation 220 may also be configured with an RFC user account 216C, a dialog user account 218C, and a tool user account 226. As shown, analyzer client 208 may be configured with an analysis agent 228 and a transformer 230. Configuration client 210 may be configured with a configuration agent 232 and a manual conversion agent 234. In one embodiment, the collection agent 214 is able to communicate with collection plug-ins 222A and 222B via a network 104. As shown, in some embodiments, analysis agent 228 and transformer 230 may be configured to use RFC user accounts 216A-216C for communicating with systems 202-206. Transformer 230 may also be configured to use tool user account 226. Additionally, in some embodiments, configuration agent 232 and manual conversion agent 234 may be configured to use dialog user accounts 218A-218C.

Still referring to FIG. 2B and in more detail, in some embodiments, bridge system 202 may be configured with or may execute a solution manager 212. In some embodiments, solution manager 212 may be an application, process, agent, function, routine, logic, or any type and form of executable instructions for snapshotting an installation. In some embodiments, snapshotting or providing a snapshot of an installation comprises scanning and downloading components and/or associations of an installation of an application, such as source installation 220. Snapshotting may also be referred to variously as saving, capturing, imaging, or storing an image, copy or an instance of an installation. In additional embodiments, solution manager 212 may further comprise functions for compressing a snapshotted image. In still further embodiments, solution manager 212 may comprise or be associated with a storage medium capable of storing a snapshotted image. In one embodiment, solution manager 212 may connect via a network to a source installation 220, described in more detail below. The solution manager 212 may create a local copy of the entire source installation 220, or, in some embodiments, may parse the source installation 220 and copy a selected subset of the installation. For example, in one such embodiment, solution manager 212 may parse the source installation 220 for custom objects or code modified from a predetermined state of the source installation, and store only a copy of the custom objects or code. In another such embodiment, solution manager 212 may determine a difference between source installation 220 and target installation 224 and store only the difference.

In many embodiments, solution manager 212 further comprises functionality for identifying an object as being in a predetermined state or being in a modified state. For example, an object that has not been customized may, in some embodiments, be considered to be in a predetermined state. A predetermined state of an installation, in such embodiments, may be the state of the installation prior to customization or addition of custom objects, functions, or code. In further embodiments, solution manager 212 may comprise functionality for identifying an object as an asset within-scope, such as a program, a database, or a screen, or an asset out-of-scope, such as a task-management system, a scheduler, an interface, a peripheral system, or a development environment. In yet further embodiments, solution manager 212 may comprise functionality for storing the identification of objects in a database, index, or list, which may be referred to as a worklist. In some embodiments, this worklist may be sent to the analyzer client 208, described in more detail below.

In many embodiments, solution manager 212 further comprises functionality for checking an object or code for compliance with a language syntax 282 and/or semantic rules 284. For example, an object or code modified with custom programming may no longer be compliant with a standard syntax. In such a case, solution manager 212 may identify the object as being not in compliance. In another embodiment, an object or code may be modified, but still be compliant with a standard syntax. In such a case, solution manager 212 may identify the object as being compliant.

In some embodiments, as shown in FIG. 2B, solution manager 212 may comprise or include a collection agent 214. Collection agent 214 may be an application, process, agent, function, routine, logic, or any type and form of executable instructions for downloading or copying all or part of a source installation 220 to bridge system 202. In some embodiments, collection agent 214 connects via a network to a collection plugin 222A and/or collection plugin 222B, described in more detail below. Collection agent 214 may, in some embodiments, comprise functions for downloading source installation data as described above. In further embodiments, collection agent 214 and collection plugins 222A and 222B may be a standard application type or comply with a standard application type and be executed by the source installation 220 and/or target installation 224 without necessary modifications.

As shown in FIG. 2B, solution manager 212, source installation 220 and target installation 224 may include user accounts, such as Remote Function Call (RFC) users 216A-216C, Dialog users 218A-218C, and Tool user 226. RFC users 216A-216C (referred to generally as RFC user(s) 216) may be an account with authentication features, such as a login name and password or other security methods, and privileges allowing the account to get data from and insert data into source installation 220 and/or target installation 224. In some embodiments, data inserted or retrieved from an installation may comprise objects, code, or functions. In some embodiments, RFC users 216 may also be referred to as System or Communication users. In further embodiments, the Dialog users 218A-218C (referred to generally as Dialog user(s) 218) may be an account with authentication features, similar to those mentioned with regard to RFC users 216, and privileges allowing the account to interact with programs and functions of source installation 220 and/or target installation 224. In some embodiments, a dialog user 218 may have fewer privileges or more limited access than an RFC user 216. In additional embodiments, the Tool user 226 may be an account with authentication features, similar to those mentioned with regard to RFC users 216 and Dialog users 218, and privileges allowing the account to use modification tools on target installation 224.

As shown in FIG. 2B, source system 204 may comprise a source installation 220. As discussed above, in connection with the discussion of source system 204, source installation 220 may be an installation or configuration of a version of one or more applications. In one embodiment, the one or more applications may comprise an enterprise resource planning (ERP) software, such as SAP Business Suite or SAP R/3, manufactured by SAP AG of Walldorf, Germany; Microsoft Dynamics, manufactured by Microsoft Corporation of Redmond, Washington; PeopleSoft, manufactured by Oracle Corporation of Redwood Shores, California; or any other type and form of enterprise or manufacturing resource planning software. In another embodiment, the one or more applications may comprise any application that comprises a default or initial installation in a predetermined state, and modifications to objects from the default state. In yet another embodiment, the source system or source installation may comprise any type or form of application containing modifications from an initial or default state. As shown, source installation 220 may include one or more RFC users 216 and/or dialog users 218, discussed above.

Additionally, source installation 220 may include or be configured with a collection plugin 222A (generally referred to as a collection plugin 222). Collection plugins 222 may comprise logic, services, hooking functions, routines, or any other type and form of function for gathering data of an installation, such as source installation 220 or target installation 224. In some embodiments, collection plugins 222 may further comprise functions for snapshotting or recording an image of an installation as the installation exists at a certain point in time. In some embodiments, collection plugins 222 may include the ability to push data over a network to collection agent 214, while in other embodiments, collection agent 214 may pull data from the collection plugins.

Target system 206 may comprise a target installation 224. As discussed above, in connection with the discussion of target system 206, target installation 224 may be an installation or configuration of a second or subsequent version of one or more applications, such as a version similar to but different from a previous version of one or more applications on source system 204. As described above, source installation 220 may comprise custom objects, codes or functions. Using the methods and systems described herein, target installation 224 may be efficiently modified to comprise the custom objects, codes or functions of source installation 220. In some embodiments, target installation 224 may comprise additional modifications to allow the custom objects, codes or functions to execute or interact properly with the second version of the one or more applications. As shown, in some embodiments, target installation 224 may include or comprise a collection plugin 222B, and may include or be configured with accounts for RFC User 216C, Dialog User 218C, and Tool user 226, discussed above.

As shown, analyzer client 208 may comprise or include an analysis agent 228 and/or a transformer 230. Analysis agent 228 may comprise one or more applications, logic, functions, services, routines or executable instructions of any type or form, for parsing a first and/or a second installation of an application and creating a meta-model, described in more detail below. In some embodiments, analysis agent 228 comprises functions for downloading system objects identified by the solution manager 212 for transformation. In additional embodiments, analysis agent 228 comprises functions for parsing the source code of programs, databases, screens, task management systems, schedulers, interfaces, peripheral systems, development environments, and other libraries for keywords, functions, objects, or code corresponding to a defined language and syntax. In further embodiments, analyzer client 208 may comprise functions for detecting syntax and language violations. In one such embodiment, analyzer client 208 may comprise functions to categorize or identify the object, responsive to detected violations, as available for automatic upgrade, semi-automatic upgrade, or manual upgrade. In an additional embodiment, analyzer client 208 may comprise functionality for presenting the categorized objects and/or meta-model to a user or administrator. In some such embodiments, presenting the objects and or meta-model may comprise creating and presenting a report, and may include analysis of severity of required upgrades, expected processing time, percentage of upgrade that may be performed automatically, and/or cost to perform upgrading of the source installation.

In some of the embodiments described herein, a system or method may be described as automatic, semi-automatic or manual. An automatic system or method may be such a system or method that performs any of the upgrades, transformations or conversion described herein without any user input during the upgrade, transformation or conversion or with a level of user input below a predetermined threshold. A semi-automatic system or method may be such a system or method that performs any of the upgrades, transformations or conversion described herein with combination of a level of automation and a level of user input during the upgrade, transformation or conversion below a predetermined threshold or within a predetermined threshold range. A manual system or method may be such a system or method that performs any of the upgrades, transformations or conversion described herein without automation during the upgrade, transformation or conversion or with a level of automation below a predetermined threshold. In addition, in the description herein, objects or code of a system may be referred to as comprising automatic code; comprising semi-automatic code; or comprising manual code. Similar to the systems and methods described above, automatic code may be upgraded, transformed or converted without any user input during the upgrade, transformation, or conversion. Semi-automatic code may be upgraded, transformed or converted with a combination of a level of automation and a level of user input during the upgrade, transformation, or conversion below a predetermined threshold or within a predetermined threshold range. Manual code may be upgraded, transformed, or converted without automation during the upgrade, transformation or conversion or with a level of automation below a predetermined threshold.

Transformer 230 may comprise one or more applications, logic, functions, services, routines or executable instructions of any type or form, for transforming a meta-model from one corresponding to one installation of an application, to one corresponding to another installation of an application, such as between a first and second or subsequent installation of the application. In some embodiments, transforming a meta-model comprises applying rules for modifying an object from a syntax or code language associated with the first installation to a syntax or code language associated with the second installation. For example, in one embodiment, a first language may include a function for allowing text input into a database. The second language may include a similar function, but add different possible text encodings, such as Unicode Transformation Format (UTF)-8 or punycode. In such an embodiment, the transformer 230 may apply a rule indicating to add a default encoding type to the function. Thus, the object utilizing the function may then be used by the second installation with the second language and syntax. In some embodiments, transformer 230 further comprises functions for error checking transformed objects for compliance with rules, language, and/or syntax standards. In another embodiment, transformer 230 further comprises functions for uploading transformed objects to target installation 224.

As shown, analysis agent 228 and transformer 230 may, in some embodiments, be configured to use RFC users 216A-216C on the solution manager 212, source installation 220, and target installation 224, respectively. This may enable analysis agent 228 and transformer 230 to retrieve and input data, code, and objects from and to these three systems. In a further embodiment, transformer 230 may be configured to use tool user 226 on target installation 224. This may enable transformer 230 to interact with system objects of the target installation 224 that an RFC user may not be privileged to modify.

Also shown in FIG. 2B, configuration client 210 may, in some embodiments, comprise a configuration agent 232 and/or a manual conversion agent 234. In some embodiments, configuration agent 232 and manual conversion agent 234 may be configured to use Dialog Users 218A-218C, as shown. This may enable a user or administrator interacting with configuration agent 232 and/or manual conversion agent 234 to further interact with solution manager 212, source installation 220, and/or target installation 224. In an embodiment not illustrated, configuration agent 232 and/or manual conversion agent 234 may also control or interact with analysis agent 228 and/or transformer 230 for the purpose of modifying their settings.

Configuration agent 232 may comprise one or more applications, routines, services, functions or executable instructions of any form or type for configuring a rules engine 248, discussed in more detail below. In other embodiments, configuration agent 232 may comprise functions for configuring solution manager 212, source installation 220, and/or target installation 224. For example, in one such embodiment, configuration agent 232 may configure the solution manager 212 to only scan certain databases when snapshotting and categorizing objects.

Manual conversion agent 234 may comprise one or more applications, routines, services, functions or executable instructions of any form or type for allowing a user or administrator to perform modifications to objects categorized for semi-automatic or manual upgrade. In some embodiments, manual conversion agent 234 may present a dialog to a user, indicating the object to be upgraded, and a language or syntax issue that could cause an error if the object is installed in target installation 224. In some embodiments, manual conversion agent 234 may also present suggested modifications to the object, based on rules applied by the analysis agent 228. In further embodiments, manual conversion agent 234 may comprise functions for modifying the object, responsive to an instruction from the user. In a further embodiment, manual conversion agent 234 may comprise functions for uploading the modified object to target installation 224 and/or analyzer client 208. In one example embodiment, the manual conversion agent 234 may present a dialog to a user indicating that an object of the source installation, when upgraded to the target installation, may perform an illegal operation due to differences in syntax, such as dividing by a variable that has been set to zero. The user may instruct the manual conversion agent 234 to make a modification, such as changing the value of the variable, or directing the operation to a different variable.

Figure 2C:
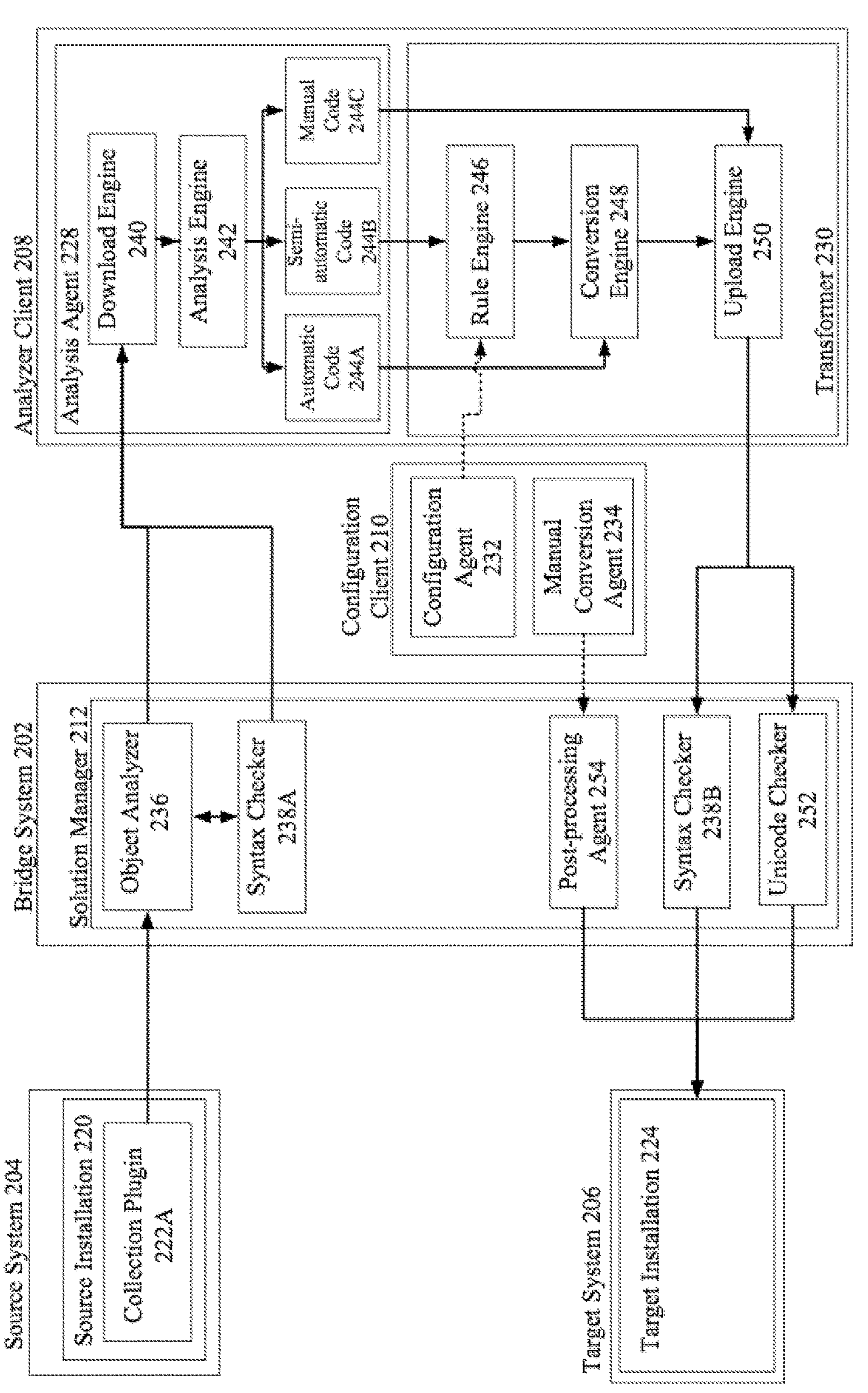
FIG. 2C is block diagram of another embodiment of an appliance for analyzing and transforming an application from a source installation to a target installation.

Shown in FIG. 2C is another embodiment of a system for analyzing and transforming an application from a source installation to a target installation. In brief, source system 204 may comprise a source installation 220 and collection plugin, 222A, discussed above. Bridge system 202 may comprise a solution manager 212, discussed above, which may comprise an object analyzer 236, syntax checkers 238A-238B, unicode checker 252 and post-processing agent 254. Analyzer client 208 may comprise an analysis agent 228, which may further comprise a download engine 240 and an analysis engine 242. The analysis engine may categorize code as automatic code 244A, semi-automatic code 244B, or manual code 244C. Semi-automatic code 244B is passed to a rule engine 246 configured on transformer 230. Rule engine 246 may apply rules to the semi-automatic code 244B, and pass the code to conversion engine 248. Automatic code 244A is passed from the analysis agent 228 to the conversion engine 248. Automatic code 244A and semi-automatic code 244B are passed from the conversion engine 248 to the upload engine 250. The upload engine 250 may upload converted automatic code 244A and semi-automatic code 244B and unconverted manual code 244C to bridge system 202 and solution manager 212. Configuration client 210 may comprise a configuration agent 232, which may configure rule engine 246 of transformer 230, and a manual conversion agent 234, which may interact with post-processing agent 254 of solution manager 212. Although not shown, solution manager 212 may, in some embodiments, comprise an upload engine 250' for transmitting processed and converted code to target installation 224 of target system 206.

Still referring to FIG. 2C and in more detail, solution manager 212 may be configured with an object analyzer 236. In some embodiments, object analyzer 236 may comprise one or more applications, routines, services, functions or executable instructions of any form or type for analyzing an object obtained from collection plugin 222A. Although not shown, object analyzer 236 may further comprise functions for downloading objects identified by collection plugin 222A, such as a collection agent 214 discussed above. Analyzing an object, as discussed above in connection with solution manager 212, may comprise determining if the object is compliant with a standard syntax and identifying the object, responsive to the determination, as compliant or non-compliant. Accordingly, and as shown, object analyzer 236 may interact with syntax checker 238A. In some embodiments, syntax checker 238A is a separate process, while in others, syntax checker 238A is a function or subroutine of object analyzer 236. In still other embodiments, object analyzer 236 may be a function or subroutine of syntax checker 238A.

Syntax checker 238A may, in some embodiments, comprise one or more applications, routines, services, functions or executable instructions of any form or type for comparing an object to a standard syntax. In some embodiments, syntax checker 238A may comprise associated libraries, dictionaries, databases, or other data structures identifying syntax, functions, connectors, comments, instructions, code, or other objects of one or more languages. For example, in one embodiment, syntax checker 238A may include or be associated with a library defining objects in the Advanced Business Application Programming (ABAP) designed by SAP AG of Walldorf, Germany or using SAP HANA database artifacts. In another embodiment, syntax checker 238A may include a library defining objects in Java, PHP, Python, Perl, SQL, or any other code language. In some embodiments, syntax checker 238A compares code within an object identified by or obtained from collection plugin 222A with code in the library defining objects in a related language. In one example embodiment, syntax checker 238A receives an object from collection plugin 222A that comprises a WRITE command. The syntax checker 238A compares the object to a dictionary, which indicates that the WRITE command has been replaced by a WRITE TO command. Responsive to this comparison, the syntax checker 238A and/or object analyzer 236 identifies the object as being non-compliant. In some embodiments, the identification of an object as compliant or non-compliant may be in a separate object, database, registry, or data structure, while in other embodiments, the identification may be inserted into the object.

As shown, analysis agent 228 may include a download engine 240. Download engine 240 may comprise hardware and/or software components comprising functions or executable instructions for downloading one or more objects and/or identifications of objects as compliant or non-compliant from solution manager 212. In some embodiments, download engine 240 utilizes an RFC user account on solution manager 212 to download objects and/or identifications, as discussed above.

Analysis engine 242 may, in some embodiments, comprise one or more applications, routines, services, functions or executable instructions of any form or type for analyzing a capability of an object for upgrade to a target installation. For example, in one embodiment, an object identified as compliant with syntax of the language of the target installation may be determined to be capable of automatic upgrading and be identified as automatic code 244A. In one such embodiment, the object may need no modifications to be used by the target installation 224. In another such embodiment, the object may be identified as non-compliant, but need only minor modifications. For example, a comment indicator (") used by the language of the source installation may be converted to a comment indicator (#) of the language the target installation without requiring additional analysis. Similarly, a function that included no variables in the source installation, such as CLOSE may be converted to a function that includes optional variables in the target installation, such as CLOSE( ), without requiring additional analysis.

In another embodiment, analysis engine 242 may determine that a non-compliant object needs modifications that may be performed automatically, but also needs modifications that require additional input, such as from a user or developer. This may be referred to as semi-automatic code. For example, in one embodiment, source installation objects may include unicode characters, binary data, or a mix of binary data. In one such embodiment, the target installation may include a function that interacts with objects differently if they are binary or unicode. In such an embodiment, the analysis engine 242 may indicate that some of the objects—those that are solely binary or unicode—may be converted automatically, while objects that are mixed binary and unicode may require a user to designate a mode. In such an embodiment, analysis engine 242 may indicate that the objects are semi-automatic code 244B. In another example, an object of the source installation may contain a function that writes into a database. In one such embodiment, the target installation may have more than one corresponding database. For example, source installation 220 may be a single user environment and have only one user database, while target installation 224 may be a multi-user environment. In some embodiments, the WRITE function may need to have modifications that can be performed automatically, such as the addition of optional variables, or conversion to a WRITE TO statement, and modifications that require input from a user, such as a path to a specific directory or database in the multi-user environment of the target installation. Again, in such an embodiment, analysis engine 242 may indicate that the objects are semi-automatic code 244B.

In another embodiment, analysis engine 242 may indicate that a non-compliant object may not be automatically or semi-automatically converted to the language and/or syntax of the target installation 224, and may identify the object as manual code 244C. For example, a source installation object may use a function of the source installation language that has been obsoleted or for which no corresponding function exists in the target installation. In one such embodiment, the source installation object may read from a common memory. However, in the target installation, a common memory may have been replaced by isolated memory for privacy and security reasons. Accordingly, a READ COMMON function may be obsolete. Upgrading the function or an object using the function may, in such an embodiment, require further input not available to the transformer 230. Responsive to this determination, analysis engine 242 may indicate that the object is manual code 244C.

In further detail of some of the embodiments of automated systems and methods, an object of a source installation may have elements capable of being upgraded, transformed, or converted to a language and syntax of a target installation in a manner essentially independent of additional user, developer input, or other external control. These elements may be referred to as automatic code, or automatic elements. In other embodiments, an object may have elements that are incapable of being upgraded, transformed, or converted to a language and syntax of a target installation in a manner essentially independent of additional user, developer input, or other external control. These elements may be referred to as manual code, or manual elements. In some embodiments, an object may have a combination of both automatic elements and manual elements. In these embodiments, the ratio of elements that are capable of upgrade to elements in the object may used to determine an automation value for the object. In further embodiments, the automation value may be compared to one or more thresholds. For example, if the automation value is equal to or less than a first threshold, the object may be categorized as manual. If the automation value is equal to or greater than a second threshold, the object may be categorized as automatic. If the automation value is greater than the first threshold, but less than the second threshold, the object may be categorized as semi-automatic. In some embodiments, the first threshold may be set at zero, such that an object may be categorized as manual only if it has no elements that are capable of upgrade. In other embodiments, the second threshold may be set at 1, such that an object may be categorized as automatic only if it has no elements that are incapable of upgrade.

In a further embodiment, analysis engine 242 may create a meta-model representative of one or more objects of source installation 220. The meta-model, in some embodiments, may be a syntax tree or abstract syntax tree, and may represent relationships between the one or more objects of the source installation 220. In further embodiments, the meta-model may be presented to a user in either a textual or graphical format. In additional embodiments, the meta-model may contain links to corresponding source code of the one or more objects. In such embodiments, an element in the meta-model may maintain or include a reference to the original source file and line number. In further embodiments, the meta-model may also comprise a mapping of elements to objects. The meta-model, in many embodiments, is a generic structure of nodes, representing objects, and connectors, representing relationships between objects. In such embodiments, the meta-model has no syntax itself and does not correspond to a specific language. In additional embodiments, the meta-model may be used for processing and transforming objects of the source installation into objects usable by the target installation by finding and replacing patterns of connections. In some embodiments, the meta-model may map mutual relationships between objects and characterize relationships as static or dynamic. In such embodiments, a dynamic relationship between objects may change during runtime. For example, a first object may depend alternately on a second object or a third object, responsive to an indicator within a fourth object. When the indicator within the fourth object changes, the first object's dependency likewise changes. In other embodiments, the meta-model may map the relationship of objects to other system entities, such as data elements, operating system programs, system application programs, transactions, environment settings, etc.

In some embodiments, analysis engine 242 may further comprise functions for inserting comments into source code of an object. These comments may indicate suggested modifications to the object or potential errors or warnings if the object is not further modified. For example, as discussed above, an object classified as semi-automatic code 244B may require explicit identification of a working directory on the target installation 224 that does not correspond to a directory existing on source installation 220. Accordingly, analysis agent may add a comment to source code of the object indicating that a user should add explicit identification of a working directory.

Analysis agent 242 may also, in some embodiments, comprise functions or executable instructions for generating a report and/or presenting the report to a user. In these embodiments, the report may include analysis of ratios of automatic code, semi-automatic code, and manual code 244A-244C, and may include descriptions of objects, likelihood of errors when transforming objects, estimated time and/or cost to transform objects, and may include graphs, charts, and/or text. The report may also include a graphical or textual representation of the meta-model.

In additional embodiments, analysis agent 242 may be configured by a user with analysis rules. In these embodiments, analysis rules may be used to ensure that relevant information of interest to the user will be analyzed while increasing efficiency of analysis by ignoring other information. For example, rules may be set to allow analysis of just compliant or non-compliant objects, rather than both sets of objects. In some embodiments, rules may be selected to allow or disallow analysis of objects with unicode violations; analysis of objects that must change with a transformation; analysis of obsoleted objects; analysis of statistics relating to the transformation, such as time and/or cost; and analysis of transformations in specified languages, such as ABAP or Java. As referred to herein, unicode may be source code that complies with syntax and language rules of the target installation. Although referred to as unicode, it does not designate a specific embodiment of unicode, such as the unicode standard for text. Rather, unicode may simply refer to a language utilized by a target or source installation, such as Java, Python, Perl, PHP, or any other type and form of computing language. In additional embodiments, analysis rules may be configured to determine elements in the meta-model that match customer-defined characteristics, such as invocation of customer programs, use of text, specified modification dates, or any other type and form of information relating to or associated with an element.

In some embodiments, the analysis agent 242 may be used outside of a transformation context, to analyze custom code for objects in a source installation as they are being written. For example, the analysis agent may be used to measure whether coding standards are being followed, by determining if an object may be classified as automatic code 244A for transformation to a hypothetical target installation 224 that is identical to source installation 220. A determination that the object is semi-automatic code 244B or manual code 244C may indicate that additional data should be added to the object, such as full path names to directories or explicit indication of ASCII or binary data in a string.

In some embodiments, analysis engine 242 may be configured to detect object clones. An object clone may be objects that are similar to each other or similar to standard objects of the system provided by the application manufacturer. For example, one developer may create an object, such as a current invoices database, with links to customer and sales databases, and another developer may create a similar current invoices database with a different name, due to miscommunication or lack of communication. Although the names are different, the two databases are substantially similar. Future edits or modifications to one database, however, may result in behavior unexpected to a developer who only knows about the other database. Accordingly, an analysis engine may be configured to detect these clones and flag them for removal, modification, transformation, or deletion. In one embodiment, clones may be detected by comparing normalized lines of the object code to create a commonality rating. If the commonality rating exceeds a predetermined threshold, the objects may be considered clones. Similarly, in some embodiments, analysis engine 242 may be configured to detect multiple versions of an object and include only the latest version of the object for transformation.

As shown in FIG. 2C, transformer 230 may include a rule engine 246. In some embodiments, this rule engine may be configured by a configuration agent 232 on configuration client 210. Rule engine 246 may comprise an application, process, agent, function, routine, logic, or any type and form of executable instructions for modifying semi-automatic code 244B in accordance with rules selected or configured by a user using configuration agent 232. For example, as described above, an object classified as semi-automatic code 244B may require explicit identification of a working directory on the target installation 224 that does not correspond to a directory existing on source installation 220. A user may select or configure a rule that identifies a working directory to be added to the source code of the object. Rules engine 246 may then apply this rule and modify the object accordingly. In some embodiments, selecting or configuring rules may be referred to as parameterization.

Objects that are identified as automatic code 244A or have been modified by the rules engine 246 may, in some embodiments, be sent to conversion engine 248. Conversion engine 248 may comprise an application, process, agent, function, routine, logic, or any type and form of executable instructions for transforming objects from a language associated with a source installation to a language associated with a target installation. In many embodiments, rules engine 246 and conversion engine 248 may comprise similar functionality, with conversion engine 248 applying preset or predetermined rules. In such embodiments, conversion engine 248 may comprise or be associated with a database or data structure containing predetermined rules for a language or languages to allow conversion. Unlike rules configured by configuration agent 232 and applied by rules engine 246, rules applied by the conversion engine 248 may, in some embodiments, be unmodifiable by a user. In some embodiments, rule engine 246 and conversion engine 248 may be combined, and may use a single rules database. In further embodiments, configuration agent 232 may be permitted to modify only a subset of predetermined rules in the rules database. One example of a predetermined rule may be a rule indicating that a comment tag from a language associated with a source installation (") may be transformed or modified to a comment tag from a language associated with a target installation (#). Accordingly, in one embodiment of this example, conversion engine 248 may replace comment tags in a source code of an object responsive to the rule.

As shown, transformer 230 may further comprise an upload engine 250. Upload engine 250, similar to download engine 240, may comprise hardware and/or software components for uploading or transferring objects to bridge system 202. In some embodiments and as illustrated, upload engine 250 may upload converted or transformed automatic code and semi-automatic code 244A-244B, and may further upload unconverted manual code 244C. In some embodiments, download engine 240 utilizes an RFC user account on solution manager 212 to upload objects, as discussed above.

Solution manager 212 may further comprise a unicode checker 252 and a syntax checker 238B, as shown in FIG. 2C. Unicode checker 252 may comprise an application, process, agent, function, routine, logic, or any type and form of executable instructions for checking unicode compliance of a transformed object. Similarly, syntax checker 238B may comprise an application, process, agent, function, routine, logic, or any type and form of executable instructions for checking object compliance with syntax of a language associated with target installation 224. In some embodiments, responsive to failure to comply with syntax and/or unicode, solution manager 212 may present warnings or errors to a user. In other embodiments, responsive to failure to comply with syntax and/or unicode, solution manager 212 may send the object back to analysis agent for re-analysis and re-transformation.

Solution manager 212 may comprise a post-processing agent 254. Post-processing agent 254 may comprise an application, process, agent, function, routine, logic, or any type and form of executable instructions for modifying an object, responsive to instructions from a user interacting with manual conversion agent 234, on configuration client 210. In some embodiments, manual conversion agent 234 may comprise an editing application allowing a user to modify source code of an object, and may include features such as automatic recognition of functions of a language; display of comments, such as those inserted by analysis engine 242; and any other features useful to a developer. Although not shown, post-processing agent 254 and manual conversion agent 234 may comprise functionality for communicating over a network to allow a user interacting with configuration client 210 to modify an object stored on bridge system 202. In an example embodiment, an object categorized as manual code 244C may be edited by a user via manual conversion agent 234 and post-processing agent 254 to repair unicode, functions, language features and/or syntax inconsistent with a language associated with target installation 224.

Although not illustrated in FIG. 2C, solution manager 212 or bridge system 202 may further comprise hardware and/or software components for uploading modified and/or post-processed objects to target installation 224.

Figure 2D:
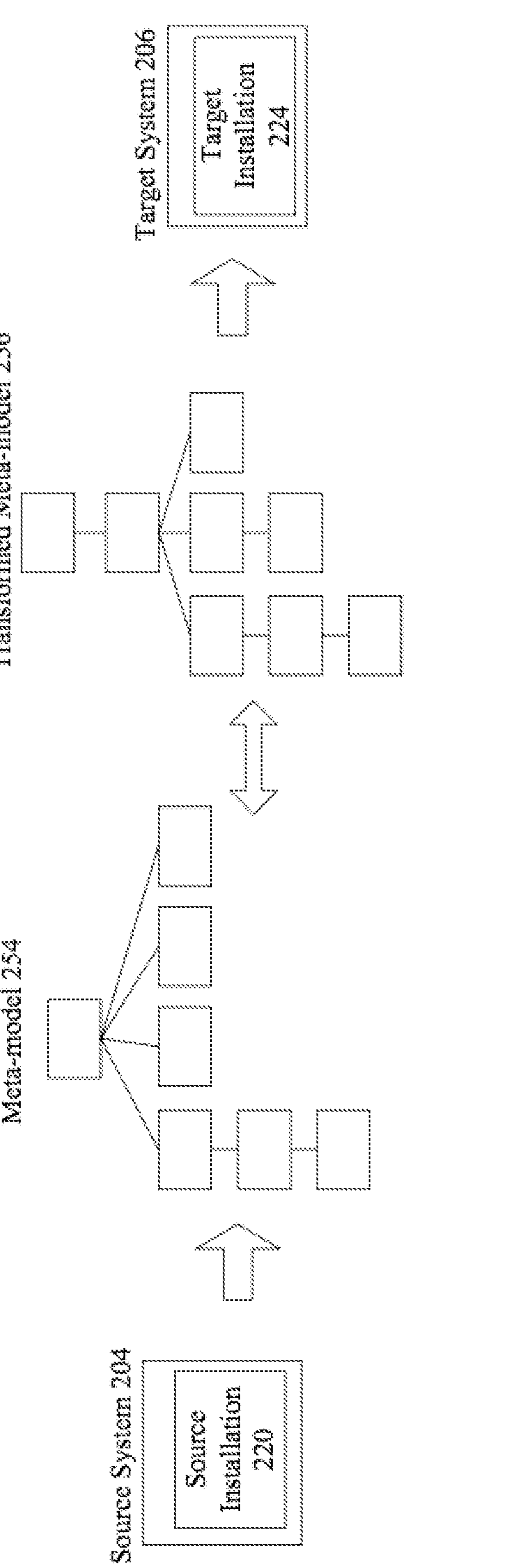
FIG. 2D is a block diagram of an embodiment of an analysis and transformation of a source installation into a target installation.

Referring now to FIG. 2D, illustrated is a block diagram of an embodiment of an analysis and transformation of a source installation into a target installation. As described above, a source installation 220 on source system 204 may be analyzed to create a meta-model 254. As shown, meta-model 254 may comprise objects, or nodes, and links or structure representative of dependencies and interactions between nodes. In some embodiments, the meta-model 254 may be transformed into transformed meta-model 256, responsive to predetermined rules and/or configured rules. For example, in a language associated with source installation 220, a first node representing a function may be dependent on a second node representing an included library of the function. However, in a language associated with target installation 224, the first node representing the function may be dependent on both a second and third node representing two included libraries. Alternately, the first node representing the function may, in the language associated with the target installation 224 have no dependencies due to explicit inclusion of code in the included library. Accordingly, in this example embodiment, transforming the meta-model 254 to transformed meta-model 256 may comprise moving the first node representing the function to a higher level within the abstract syntax tree.

Figure 2E:
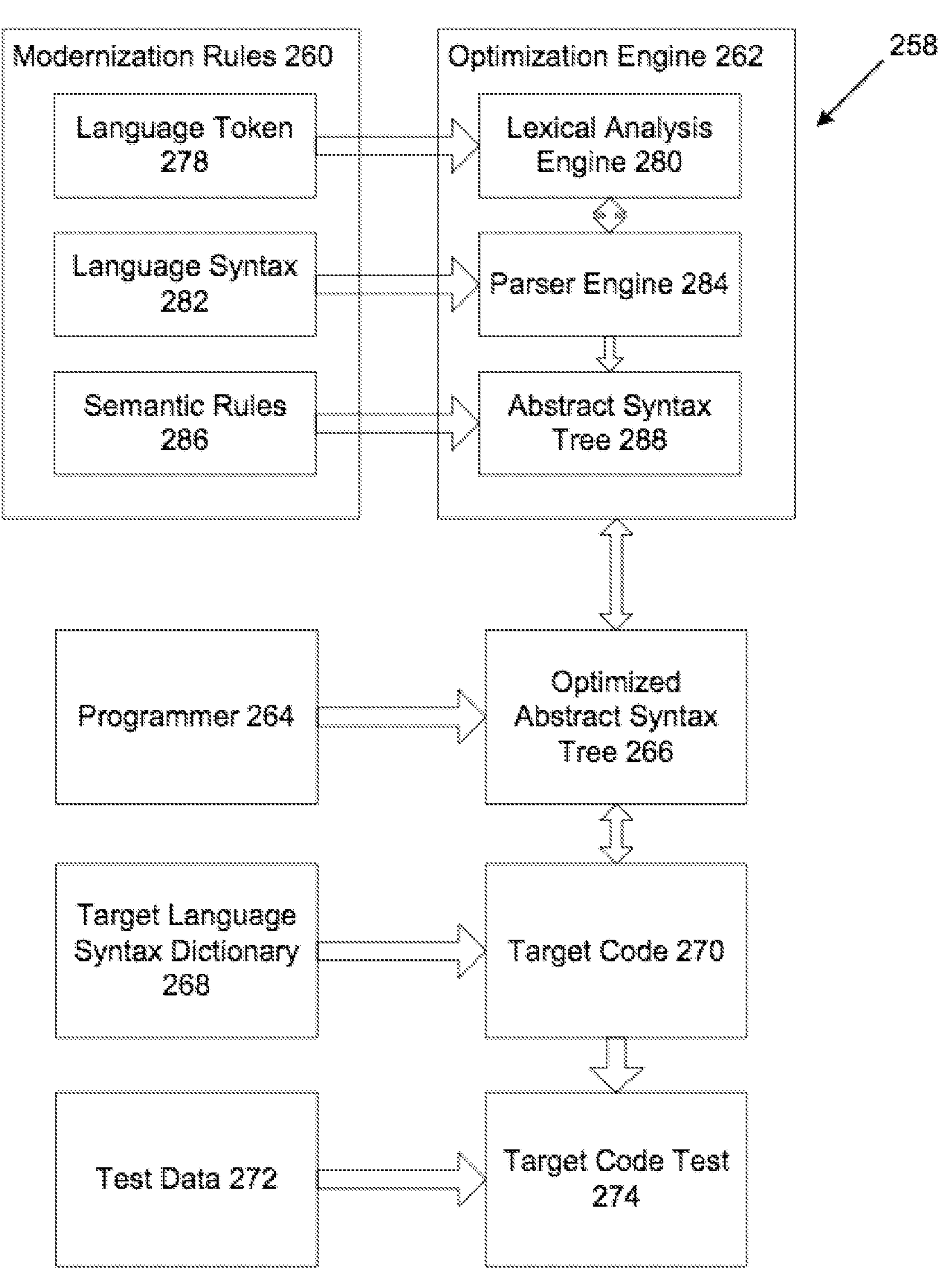
FIG. 2E is a block diagram of an embodiment of a transformation process.

Shown in FIG. 2E is a block diagram of an embodiment of a transformation process 258. In brief, an optimization engine 262 may apply modernization rules 260 to create an optimized abstract syntax tree 266. The optimized abstract syntax tree 266 may be further modified by a programmer 264 to create target code 270, associated with a target language syntax dictionary 268. Using test data 272, the target code may be tested at 274.

Still referring to FIG. 2E and in more detail, modernization rules 260 may include a language token or tokens 278, language syntax 282, and semantic rules 284. A token 278 may be a structured element of code as defined by the source language. For example, in the expression "print=(hello world);", tokens 278 include "print", "=", "(", "hello", " ", "world", ")", and ";". Determining tokens in source code is sometimes referred to as tokenization or tokenizing, and may, in some embodiments, be performed by lexical analysis engine 280, and configured on optimization engine 262. In some embodiments, language tokens 278 may be codified and, in some embodiments, stored in a database, dictionary, or other data structure.

Lexical analysis engine 280 may comprise an application, process, agent, function, routine, logic, or any type and form of executable instructions for locating and interpreting language tokens within source code of an object, as described above.

Language syntax 282 may be a representation of a grammar system within a language. A grammar may, in some embodiments, address location and manipulation of tokens. For example, a token of a semi-colon, used in the above example, may indicate in a language that it is the end of a statement. Tokens after the semi-colon may apply to the following statement, while those before the semi-colon apply to the preceding statement. Language syntax 282 may, in some embodiments, be stored in a database, dictionary, or other data structure. In some embodiments, parser engine 284, configured on optimization engine 262 may use grammar identified by language syntax 282 to parse tokens identified by lexical analysis engine 280. This may be referred to variously as syntactic analysis, semantic parsing, parsing, or analyzing.

As shown, parser engine 284 may comprise an application, process, agent, function, routine, logic, or any type and form of executable instructions for interpreting language tokens located in a source code with language syntax 282 to create an abstract syntax tree 288, also referred to above as a meta-model 254, by applying semantic rules 286. Semantic rules 286 may, in some embodiments, be stored in a database, dictionary or other data structure accessible to parser engine 284. In some embodiments, parser engine 284 may comprise a top-down parser, such as a recursive descent parser, or a Left-to-right, Leftmost derivation (LL) parser. In other embodiments, parser engine 284 may comprise a bottom-up parser, such as a precedence parser, a bounded context (BC) parser, or a Left-to-right, Rightmost derivation (LR) parser.

Using any of the methods or functions described herein, programmer 264 may convert abstract syntax tree 288 to an optimized abstract syntax tree 266. Programmer 264 may, in some embodiments, comprise part or all of analysis agent 228, discussed in more detail above. Optimized abstract syntax tree 266 may be a transformed meta-model 256, discussed above. In some embodiments, optimization of an abstract syntax tree 266 may be performed responsive to semantic rules and language syntax associated with a target language syntax dictionary 268. Objects of a source installation may be transformed to target code 270, responsive to differences between the optimized abstract syntax tree 266 and abstract syntax tree 288.

In some embodiments, test data 272 may be applied to target code 270 for testing purposes 274. In further embodiments, testing may be performed by a user, while in other embodiments, testing may be performed by a service or application identifying errors such as buffer overruns, unescaped loops, and other programming errors.

Figure 3A:
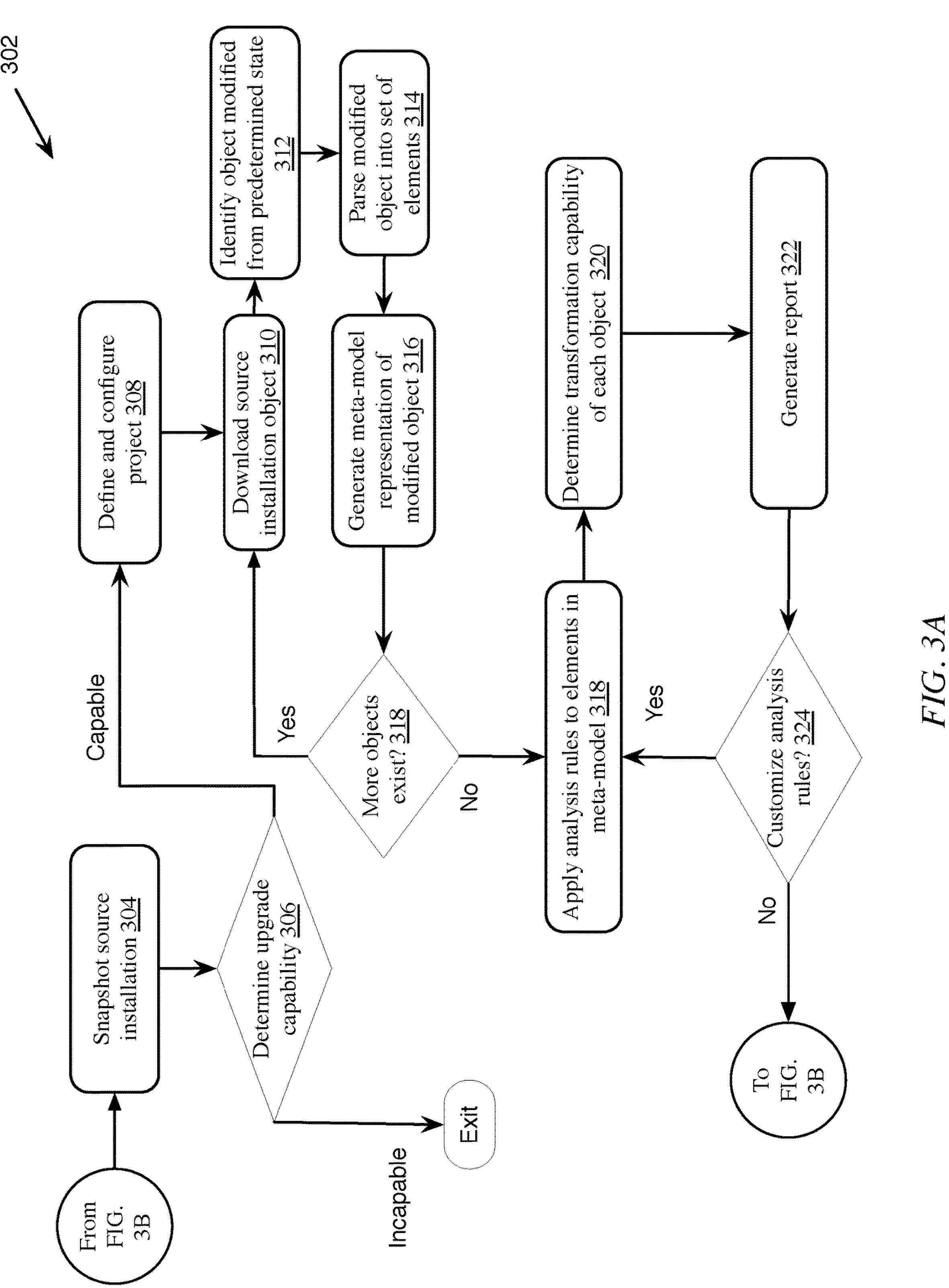
FIGS. 3A-B is a flow chart of an embodiment of a method of analyzing and transforming an application from a source installation to a target installation.
Figure 3B:
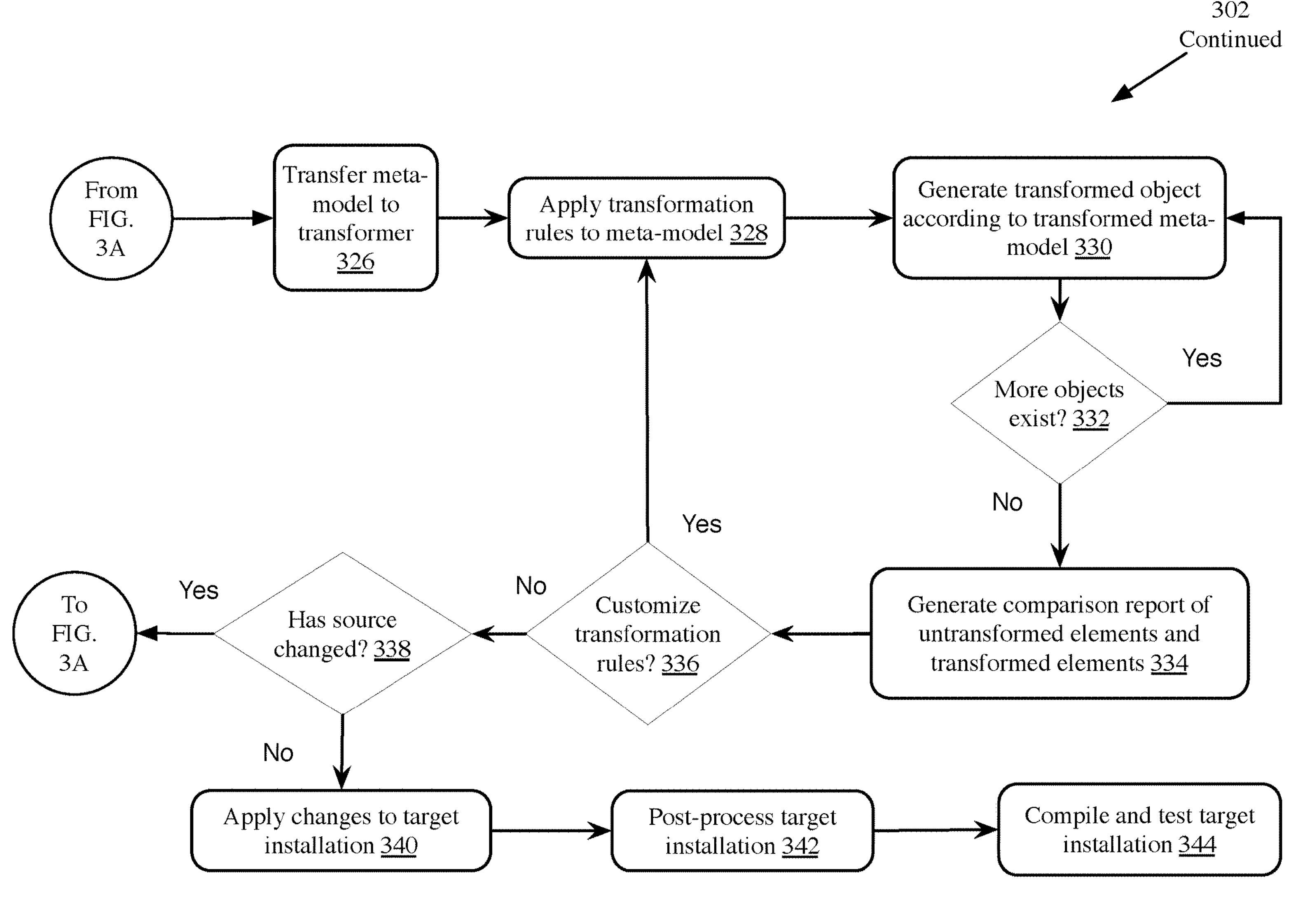

Shown in FIGS. 3A-B is a flow chart, split across two figures for clarity, illustrating an embodiment of a method 302 of analyzing and transforming an application from a source installation to a target installation. In brief, at step 304, a snapshot is taken of a source installation. At step 306, a determination is made as to whether the source installation may be upgraded. If the source installation cannot be upgraded, the method exits and may, in some embodiments, return an error or display further instructions. If the source installation may be upgraded, then at step 308, the project is defined and configured. At step 310, an object may be downloaded from the source installation. At step 312, an identification of the object may be made to determine if it has been modified from a predetermined state. In some embodiments not illustrated, responsive to a determination that the object has not been modified, the object may be discarded, and the method may move to step 318, described below. If the object has been modified, then at step 314, the object may be parsed into a set of elements. At step 316, a meta-model may be generated representing the modified object. At step 318, a determination may be made as to whether more objects exist in the source installation. If so, steps 310-318 may be repeated. In some embodiments, repetition of step 316 may comprise modifying a generated meta-model to include representations of each additional modified object parsed during repetitions of step 314.

At step 318, analysis rules may be applied to each element in the meta-model. At step 320, a determination may be made as to the transformation capability of each object. At step 322, a report may be generated and, in some embodiments, displayed to a user. At step 324, the user may customize analysis rules. If analysis rules have been customized, then steps 318-324 may be repeated. If analysis rules are not customized at step 324, then at step 326, the meta-model may be transferred to a transformer, discussed above. At step 328, transformation rules may be applied to the meta-model to create a transformed meta-model. At step 330, an object may be modified to generate a transformed object, responsive to dependencies and rules associated with the transformed meta-model. At step 332, a determination may be made as to whether more objects exist. If so, steps 330 and 332 may be repeated. If not, then at step 334, a comparison report may be generated comparing transformed objects with their untransformed states. At step 336, a user may customize transformation rules. If the rules are customized, then steps 328-336 may be repeated. At step 338, the snapshot taken at step 304 may be compared with a current state of the source installation. If the source installation has changed, then steps 304-338 may be repeated.

At step 340, transformed objects may be uploaded to the target installation. At step 342, the target installation may be post-processed, which may comprise making additional manual changes to objects uploaded to the target installation. At step 344, the target installation may be compiled and/or tested.

Still referring to FIG. 3A-B and in more detail, at step 304, a snapshot may be taken of a source installation. As described above, in some embodiments, taking a snapshot may comprise storing a copy of one or more objects of a source installation as they exist at a certain time. In further embodiments, only part of the source installation may be snapshotted. For example, in one such embodiment, only customized or modified objects of the source installation may be snapshotted, to save analyzing unnecessary elements.

At step 306, in some embodiments, a determination may be made whether the source installation may be upgraded. For example, in one such embodiment, the source installation may already have been upgraded to the same version as the target installation, and thus not require upgrading. In some embodiments, the source installation and target installation may not be compatible for an upgrade. In some embodiments, the system determines the number of changes, issues or non-compliancy exceed a predetermined threshold for upgrading to the target system.

At step 308, the project may be defined and configured. In some embodiments, defining and configuring the project may comprise selecting a version and/or language for a target installation. In additional embodiments, configuring the project may comprise installing and configuring a target installation in a default or predetermined state, lacking customized objects. In a further embodiment, configuring the project may comprise setting up RFC, Dialog, and Tool user accounts, as discussed above.

At step 310, an object may be downloaded from a source installation, using any of the methods and systems described herein, such as a collection agent and a collection plugin. At step 312, the object may be identified as modified from a predetermined state. In an alternate embodiment not shown, steps 310 and 312 may be reversed, such that objects are identified as modified before they are downloaded. Such an embodiment may allow the system to avoid downloading unmodified objects, as discussed above. In some embodiments, identifying an object modified from a predetermined state may comprise identifying an object that does not exist in a source installation. For example, a custom database may not exist in a default source installation, and accordingly may be considered to be a modified object.

At step 314, the object may be parsed into a set of elements, using any of the methods and systems described herein. For example, an object source code may be tokenized and parsed to determine elements and relationships between elements.

At step 316, a meta-model may be created and/or modified to include the elements and relationships identified at step 314, using any of the methods and systems described above. For example, creating the meta-model may comprise creating an abstract syntax tree representative of the elements and their interrelationships. The system may generate a meta-model for all the elements of the source installation. In some embodiments, the system may generate a meta-model for a portion of elements of the source installation, such as the elements identified as changed from the predetermined state.

At step 318, a determination may be made as to whether more objects and/or modified objects exist in the source installation, and if so, steps 310-318 may be repeated. In some embodiments, this determination may be made by comparing the number of nodes in the meta-model with the number of identified objects in the source installation snapshot. In other embodiments, this determination may be made by failing to locate an additional object or modified object that has not yet been downloaded and parsed.

At step 318, analysis rules may be applied to each element in the meta-model. At step 320, a transformation capability may be determined for each object. For example, an object may be classified as automatic code, semi-automatic code, or manual code, as described above. At step 322, a report may be generated. In some embodiments, applying analysis rules comprises performing the functions described above in connection with the analysis client and/or analysis engine. In additional embodiments, generating a report comprises analyzing statistics of the transformation capability of each object, such as determining ratios of automatic, semi-automatic, and manual code, and determining cost and/or time to perform upgrades, as described above.

At step 324, analysis rules may be customized, and steps 318-324 repeated. For example, responsive to determining that upgrading may be too costly due to a large number of objects to be transformed, a user may modify analysis rules to exclude a portion of the objects. Steps 318-324 may be repeated in some embodiments until the user is satisfied with the outcome indicated by the generated report.

At step 326, the meta-model may be transferred to the transformer. In some embodiments, transferring the model may comprise transmitting the model to the transformer, while in other embodiments, transferring the model may comprise the analysis client instructing the transformer to access the model on a shared memory element.

At step 328, the transformer may apply transformation rules to the meta-model to generate a transformed meta-model, using any of the systems and methods discussed herein. In one embodiment, applying transformation rules may comprise locating a pattern in the meta-model corresponding to an entry in a transformation rule database. In a further embodiment, applying transformation rules may comprise modifying an abstract syntax tree according to a rule associated with an entry in a transformation rule database. For example, in one such embodiment, the transformer may determine that a first element is dependent on a second element. The transformer may further determine that the second element is a function call, such as a WRITE instruction. The transformer may locate a rule in the rule database associated with target installation language matching a first element dependent on a WRITE instruction, and apply the rule to modify the WRITE instruction to a WRITE TO instruction.

At step 330, in some embodiments, the transformer may generate a transformed object according to the transformed meta-model. In some embodiments, generating a transformed object comprises modifying a source object. In other embodiments, generating a transformed object comprises generating a new object. In one embodiment, a transformed object may be generated responsive to transformation rules, discussed above. For example, an object including code representing a WRITE instruction, as discussed at step 328, may be modified to include code representing a WRITE TO instruction. Further changes may be made responsive to transformation rules and/or the transformed meta-model. For example, a first object dependent on a second object in the original meta-model may be dependent on a third and fourth object in the transformed meta-model. Accordingly, at step 330, the transformer may replace, in source code of the first object, references to the second object with references to the third and/or fourth object. In an example of one such embodiment, in a source installation, a first object comprising a human resources database, may be dependent on another object comprising an organizational hierarchy. However, in the transformed meta-model, the human resources database may further comprise organizational hierarchy and not be dependent on a second object. Accordingly, in this example embodiment, the transformer may modify the first object to further comprise fields indicating levels and interconnections previously described in object comprising the organizational hierarchy. In further embodiments, generating a transformed object may comprise generating an object that possesses desired characteristics defined by the transformation rules, such as being free of syntax violations and/or naming convention errors, or any other type of characteristic of a source code that may be desired by a user.

At step 332, a determination may be made if more objects exist, using similar methods to those described above at step 318. If so, steps 330-332 may be repeated.

At step 334, a comparison report may be generated. In one embodiment, a comparison report comprises a comparison of untransformed elements and/or objects and transformed elements and/or objects. In a further embodiment, the comparison report may be displayed or presented to a user. For example, in an embodiment of the example discussed above at step 330, a report may be generated showing (a) the first object comprising the human resources database with source code showing dependency on the second object comprising the organizational hierarchy; and (b) the first object comprising the human resources database with source code showing no dependency on the second object, but rather including additional data representing the hierarchical levels and interconnections.

At step 336, the user may customize the transformation rules. In some embodiments, this may be done for increasing efficiency, adjusting for undesired behavior, or any other reason. Referring to the example discussed above at step 334, a user may decide that it is preferable to maintain the separate human resources database and organizational hierarchy, and may adjust the transformation rules to exclude or disable this transformation. In another example, an organization may be expanding simultaneously with upgrading, and may be adding additional manufacturing locations. In such an example, a user may modify the transformation rules to incorporate the additional resources for each new manufacturing location, such as additional inventory databases, additional shipping locations, or any other type and form of resource or object. In some embodiments, if the user has customized or modified the transformation rules, steps 328-336 may be repeated.

At step 338, the analysis client may determine if the source installation has changed since the snapshot was taken. This could occur, for example, if analysis, transformation, and customization have taken a significant amount of time. If so, steps 304-338 may be repeated. In some embodiments, repeating steps 304-338 may comprise repeating steps 304-338 only on objects that have been modified in the source installation since the previous snapshot. These embodiments may reduce analysis, transformation, and customization time greatly, as only objects that have changed will need to be re-analyzed and transformed. In further embodiments, transformed objects that have not changed in the source installation may be stored on a storage element until the determination at step 338 indicates that no further changes have occurred in the source installation.

Responsive to no further changes having occurred in the source installation since the previous snapshot was taken, at step 340, the object transformations may be applied to the target installation. In some embodiments, applying the transformations may comprise uploading or transmitting transformed elements and/or objects to the target installation, using any of the methods or systems discussed herein.

At step 342, the target installation may be post-processed. In some embodiments, post-processing the target installation may comprise editing manual or semi-automatic code, as discussed above. In additional embodiments, post-processing the target installation may comprise optimizing the installation. For example, optimization may include compressing the installation, removing unnecessary comments and/or code, cleaning up or removing unused variables, or any other type and form of source code optimization.

At step 344, the target installation may be tested. In some embodiments, step 344 may further comprise compiling the target installation. In other embodiments, the target installation does not require compiling, for example, if all objects are XML objects. In some embodiments, testing the target installation comprises installing test data to the target installation, performing modifications to objects and databases, and verifying expected results. In some embodiments, responsive to errors during testing, one or more steps of method 302 may be repeated, for example steps 328-344.

As discussed above, these methods of using a cloud service for application transformation provide both flexibility in deployment and advantages in parallel and concurrent processing and transformation of objects of the application. This may reduce the need for customers of the application transformation service to supply local infrastructure, and allow the service to support the needs of multiple customers simultaneously.

C. Systems and Methods for Dynamically Modifying Code and Data from a Row-Oriented Syntax to a Column-Oriented Syntax As discussed above, column-oriented databases may allow more efficient processing for many calculations than row-oriented databases, particularly for structures in which columns have homogeneous data types or associated data that is frequently processed together. While creating new implementations of column-oriented databases and related applications and functions may be relatively easy, upgrading existing systems built on a row-oriented syntax may be more complicated, typically requiring significant manual rewriting of applications. Accordingly, the present disclosure is directed to systems and methods for automated analysis and transformation of these applications and databases from a row-oriented syntax to a column-oriented syntax, including analyzing and extracting data and code, re-orienting the data and rewriting read and select operations, and optimizing the code for better performance.

Referring briefly to FIGS. 4A and 4B, in many embodiments of upgrading and converting legacy systems and applications to modern implementations, databases may need to be converted from a row-based syntax 412 as shown in FIG. 4A to a column-based syntax 414 as shown in FIG. 4B. Data may be read from each element in a column 402A-402N iteratively and written to a new contiguous memory store or array 410A as shown. In some implementations, a counter or pointer may be maintained during transformation to identify a current column and incremented as each new array 410 is written.

Figure 4C:
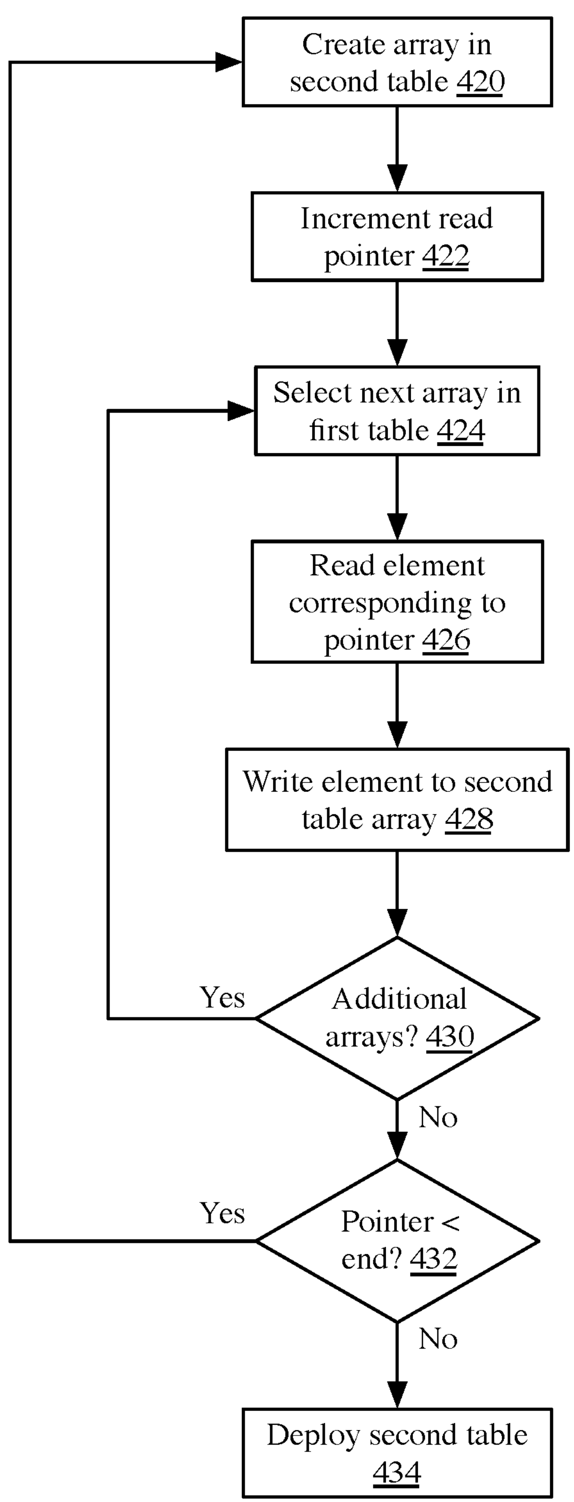
FIG. 4C is a flow chart of an implementation of a method for conversion of databases from row orientation to column orientation.

FIG. 4C is a flow chart of an implementation of a method for conversion of databases from row orientation to column orientation. Although referred to as a first and second database, respectively, these terms are used merely to distinguish the databases. In some implementations, at step 420, a transformer may create a new array in a new or second database or data table. Creating the new array may comprise writing a header and/or footer to a region of memory, reserving one or more blocks of contiguous memory, or other such functions. In one such implementation, an analyzer may pre-determine a length for the new array by identifying the total length of elements in the column of the arrays of the first database or data table, such that the entire contiguous region of memory may be reserved. In another such implementation, the analyzer may reserve an amount of memory equal to the number of arrays (e.g. rows) in the first database times a maximum size for each element (e.g. 16 bits, 32 bits, 64 bits, etc., depending on the implementation). In other implementations, the memory may not be reserved in advance; rather, a transformer may write elements to the array during transformation and an end element, footer, or end of file or line indicator of the array may be written after writing all elements to the memory.

At step 422, in some implementations, a read pointer may be incremented to identify the column of the data table. The pointer may be maintained by either the analyzer or transformer or another element of the system, and may identify a current column of data being processed.

At step 424, the transformer may select a first array in the first table or database (or next array for successive iterations). In some implementations, selecting the array may comprise accessing, retrieving, or reading the array from memory.

At step 426, the transformer may read an element from the array corresponding to the read pointer or counter. In some implementations, reading the element may comprise reading data from a position in the array based on the read pointer. For example, in one such implementation, the read pointer may identify a column having a predetermined starting position, based on a sum of the lengths of data or reserved memory for data in previous columns (e.g. given a first column storing 32 bits of data and a second column storing 16 bits of data, a pointer identifying the third column of data may identify a starting position of the 49th bit of data). In other implementations, the transformer may read through the array until encountering an element identifier corresponding to the read pointer. For example, in one such implementation, each element may be bounded by a predetermined starting and/or ending identifier (e.g. “<” and “>”; “[” and “]”; “,”; “;”; or any similar identifier or identifiers), and the transformer may read through the array while incrementing an element counter maintained by the transformer for each such identifier encountered to identify a starting position for the element to be written to the new array.

At step 428, the transformer may write or copy the element to the new array in the new database or table. Writing the element may include writing element identifiers as discussed above, depending on the syntax of the database.

At step 430, the transformer may determine if there are additional arrays or rows in the first database. If so, steps 424-428 may be repeated for each such additional array or row. If not, then at step 432, the transformer may determine if there are additional columns within the array or if the read pointer has not yet reached the last element of the arrays. If additional columns exist, then steps 420-432 may be repeated for each additional column. Accordingly, a new array may be created during each repetition of step 420 for each column.

Once all data has been copied to the second database or table, at step 434, the database may be deployed to the target installation or system, as discussed above in connection with section B.

Transforming databases from row-orientation to column-orientation also requires identifying and transforming custom applications and functions that perform processing on data across rows or columns. For example, functions that previously selected or read data from a single column across multiple row-based arrays may be modified to read from a single column-based array. Functions that may be modified include those performing sort operations, filtering, logical or mathematical comparisons or other operations, conditional selects, and iterative processing or loops, among others.

Figure 4D:
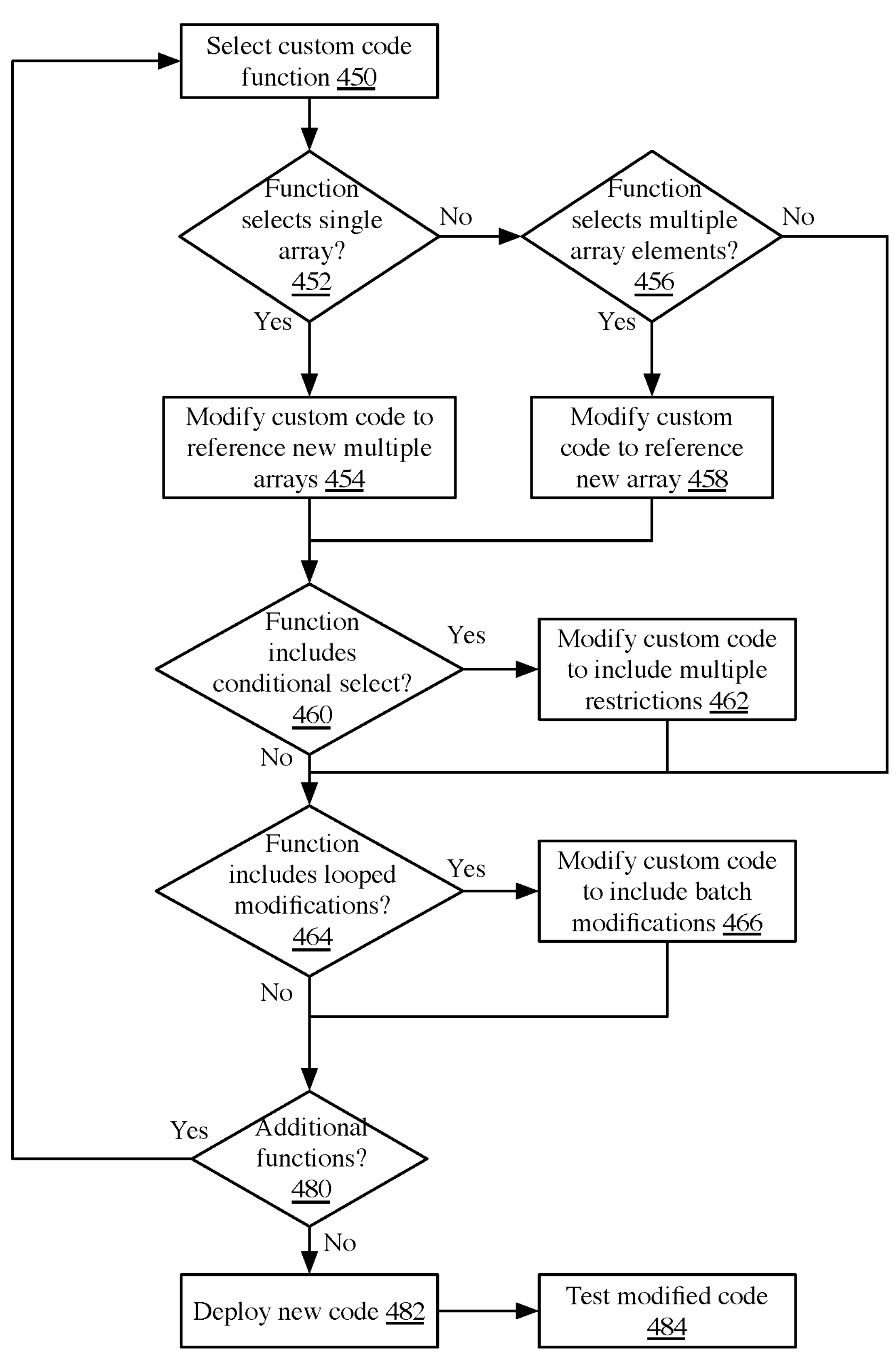
FIG. 4D is a flow chart of an implementation of a method for automated conversion of applications from use with row-oriented databases to use with column-oriented databases.

FIG. 4D is a flow chart of an implementation of a method for automated conversion of applications or functions from use with row-oriented databases to use with column-oriented databases. As discussed above in connection with section B, functions may be modified through the construction and modification of a meta-model, with transformations applied to custom code of a source installation.

At step 450, an analyzer may select a custom code function for transformation. The analyzer may iteratively step through each element of custom code, or may select code that accesses row-oriented databases. At step 452, in some implementations, the analyzer may determine if the function selects a single array or row within the row-oriented database. The analyzer may make this determination, for example, responsive to the function including only a single read or select operation, or a read operation that includes multiple elements within the array. If so, then at step 454, the function may be modified by the transformer to select multiple column-oriented arrays within the new database. The transformer may, for example, generate code for an iterative read process that reads data from multiple arrays of the target database at a specified row corresponding to the original array from the source database. The code may comprise accessing a first array, reading a designated element from the array, writing the element to a buffer, and repeating the steps for a next array.

At step 456, in some implementations, the analyzer may determine if the function selects multiple arrays or rows within the row-oriented database. For example, in one such implementation, the analyzer may identify if the function iteratively accesses multiple arrays of a source database at a predetermined element. If so, at step 458, the transformer may modify the function to access a single array in the target database corresponding to the column including the selected elements. Counters or pointers maintained by the function for iteratively selecting data may be deprecated or reused for other functions, in some implementations.

At step 460, in some implementations, the analyzer may determine if the function includes a conditional select operation. A conditional select operation may include a filtered or iterative select function with data being returned at an intermediate step, such as selecting all elements matching a first condition, and then selecting from the returned elements any elements matching a second condition. In converting from a row-based database to a column-based database, such an intermediate step may not be needed, as multiple conditions may be applied to the same column of data simultaneously. Accordingly, in some implementations, at step 462, conditional select operations with intermediate steps may be replaced by the transformer with a single selection step with multiple conditions (e.g. selecting elements matching a first condition and a second condition).

At step 464, in some implementations, the analyzer may determine if the function includes looped modifications. In some implementations, data modifications in loops (e.g. for each of a set of elements, modifying the element in some way) may result in reduced performance when databases are modified from row-orientation to column-orientation. For example, an explicit loop may be used to modify values within a column across multiple row-oriented arrays, and may be unnecessary for a single column-oriented array. Similarly, multiple modifications within a loop may require several separate read and write intermediate steps when converted. In some such implementations, at step 466, the transformer may replace the looped modification with a batch modification that performs each modification in a single step per element.

At step 480, the analyzer may determine whether additional functions exist in the source installation that have not been converted or upgraded for the target installation. If so, steps 450-480 may be repeated iteratively for each additional function. If not, then at step 482 in some implementations, the modified code and functions may be deployed to the target installation, as discussed above.

In some implementations, at step 484, modified code or a target installation may be tested. In one such implementation, testing of an upgrade may include executing corresponding functions on the source and target installations and comparing the resulting output. The analyzer may determine not only whether the outputs match, but whether processing time for a function on the target installation is similar to or faster than processing time of corresponding function on the source installation, with any significant losses in processing time indicating potential conflicts or instabilities.

Accordingly, the systems and methods discussed herein provide automated analysis and transformation of these applications and databases from a row-oriented syntax to a column-oriented syntax for optimized performance and more efficient processing of related data.

In one aspect, the present disclosure is directed to a method for automated transformation of a row-oriented syntax of a business management system to a column-oriented syntax. The method includes identifying, by an analyzer client executed by a processor of a client device, a first database of a business management system comprising a plurality of arrays in a row-oriented syntax. The method also includes creating, by a transformer executed by the processor, a first array of a second database having a column-oriented syntax. The method further includes, iteratively, for each array of the plurality of arrays of the first database, reading, by the transformer, an element at a first position of said array; and writing, by the transformer, the element to a next position of the first array of the second database.

In some implementations, the method includes creating a second array of the second database; and iteratively, for each array of the plurality of arrays of the first database: reading, by the transformer, an element at a second position of said array, and writing, by the transformer, the element at the second position to a next position of the second array of the second database. In a further implementation, the method includes advancing, by the transformer, a pointer from a first position, corresponding to the first position of the first array of the first database, to a second position, corresponding to the second position of the first array of the first database.

In some implementations, the method includes reserving a segment of memory to contain each element copied from the first position of each array of the first database. In a further implementation, the method includes determining a total length of the elements in the first position of each array of the first database; and reserving a segment of memory equal to at least the total length. In some implementations, the method includes iteratively, for each array of the plurality of arrays of the first database, reading an element at a first position of said array, and traversing said array to a predetermined starting position of the element.

In some implementations, the method includes identifying, by the analyzer client, a first function of the business management system configured to select a plurality of elements from an array of the first database; and modifying, by the transformer, the first function to select a second plurality of elements from a corresponding plurality of arrays of the second database, each of the second plurality of elements having the same position within a corresponding array of the plurality of arrays.

In other implementations, the method includes identifying, by the analyzer client, a first function of the business management system configured to select a plurality of elements from a corresponding plurality of arrays of the first database, each of the plurality of elements having the same position within a corresponding array of the plurality of arrays; and modifying, by the transformer, the first function to select a second plurality of elements from an array of the second database. In a further implementation, the method includes removing an iterative select loop from the first function. In another further implementation, the method includes providing the second database and modified first function to a target installation of the business management system.

In another aspect, the present disclosure is directed to a system for automated transformation of a row-oriented syntax of a business management system to a column-oriented syntax. The system includes a client device executing a transformer, the client device in communication with a first memory device storing a first database of a business management system, the first database comprising a plurality of arrays having a row-oriented syntax. The transformer is configured to create, in a second memory device, a first array of a second database having a column-oriented syntax. The transformer is also configured to, iteratively, for each array of the plurality of arrays of the first database, read an element at a first position of said array; and write the element to a next position of the first array of the second database.

In some implementations, the transformer is further configured to create a second array of the second database. The transformer is also configured to, iteratively, for each array of the plurality of arrays of the first database, read an element at a second position of said array; and write the element at the second position to a next position of the second array of the second database. In a further implementation, the transformer is further configured to advance a pointer from a first position, corresponding to the first position of the first array of the first database, to a second position, corresponding to the second position of the first array of the first database.

In some implementations, the transformer is further configured to reserve a region of the second memory device to contain each element copied from the first position of each array of the first database. In a further implementation, the transformer is further configured to determine a total length of the elements in the first position of each array of the first database; and reserve the region of memory equal to at least the total length.

In some implementations, the transformer is further configured to iteratively, for each array of the plurality of arrays of the first database, traverse said array to a predetermined starting position of the element. In other implementations, the transformer is further configured to modify a first function of the business management system configured to select a plurality of elements from an array of the first database to select a second plurality of elements from a corresponding plurality of arrays of the second database, each of the second plurality of elements having the same position within a corresponding array of the plurality of arrays.

In some implementations, the transformer is further configured to modify a first function of the business management system configured to select a plurality of elements from a corresponding plurality of arrays of the first database, each of the plurality of elements having the same position within a corresponding array of the plurality of arrays, to select a second plurality of elements from an array of the second database. In a further implementation, the transformer is further configured to remove an iterative select loop from the first function. In some implementations, the transformer is further configured to provide the second database and modified first function to a target installation of the business management system.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for automated transformation of a row-oriented syntax of a business management system to a column-oriented syntax, comprising:

identifying, by an analyzer client executed by a processor of a client device, a first database of a business management system comprising a plurality of arrays in a row-oriented syntax, each row-oriented array comprising a plurality of horizontally adjacent elements stored in corresponding adjacent contiguous data blocks in a memory of the business management system;

creating, by a transformer executed by the processor, a first array of a second database having a column-oriented syntax, each column-oriented array comprising a plurality of vertically adjacent elements stored in corresponding adjacent contiguous data blocks in the memory of the business management system;

iteratively, for each array of the plurality of arrays of the first database:

reading, by the transformer, an element at a first position of said array, writing, by the transformer, the element to a next position of the first array of the second database, wherein the element at the first position of said array of the first database is stored contiguously in the memory of the business management system to a second element at an adjacent second position of said array of the first database, and wherein the element written to the next position of the first array of the second database is stored contiguously in the memory of the business management system to a third element, read from a first position of a second array and written to an adjacent second position of the first array of the second database;

determining, automatically by the analyzer client and as a part of transforming the first database to the second database, a function of the business management system configured to perform data modifications includes a looped modification;

replacing, automatically by the transformer, the looped modification with a batch modification configured to perform each modification in a single step per element; and storing the modified function and the second database to a target installation.

2. The method of claim 1, further comprising creating a second array of the second database; and iteratively, for each array of the plurality of arrays of the first database:

reading, by the transformer, an element at a second position of said array, and writing, by the transformer, the element at the second position to a next position of the second array of the second database.

3. The method of claim 2, further comprising advancing, by the transformer, a pointer from a first position, corresponding to the first position of the first array of the first database, to a second position, corresponding to the second position of the first array of the first database.

4. The method of claim 1, wherein creating the first array of the second database further comprises reserving a segment of memory to contain each element copied from the first position of each array of the first database.

5. The method of claim 4, further comprising:

determining a total length of the elements in the first position of each array of the first database; and reserving a segment of memory equal to at least the total length.

6. The method of claim 1, wherein iteratively, for each array of the plurality of arrays of the first database, reading an element at a first position of said array further comprises traversing said array to a predetermined starting position of the element.

7. A system for automated transformation of a row-oriented syntax of a business management system to a column-oriented syntax, comprising a client device comprising a processor configured to execute a transformer and an analyzer client, the client device in communication with a first memory device storing a first database of a business management system, the first database comprising a plurality of arrays having a row-oriented syntax, each row-oriented array comprising a plurality of horizontally adjacent elements stored in corresponding adjacent contiguous data blocks in a memory of the business management system, wherein the transformer is configured to:

create, in a second memory device, a first array of a second database having a column-oriented syntax, each column-oriented array comprising a plurality of vertically adjacent elements stored in corresponding adjacent contiguous data blocks in the memory of the business management system, iteratively, for each array of the plurality of arrays of the first database:

read an element at a first position of said array; and write the element to a next position of the first array of the second database, wherein the element at the first position of said array of the first database is stored contiguously in memory of the business management system to a second element at an adjacent second position of said array of the first database; and wherein the element written to the next position of the first array of the second database is stored contiguously in the memory of the business management system to a third element, read from a first position of a second array and written to an adjacent second position of the first array of the second database;

determine, automatically and as a part of transforming the first database to the second database, a function of the business management system configured to perform data modifications includes a looped modification; and replace the looped modification with a batch modification configured to perform each modification in a single step per element.

8. The system of claim 7, wherein the transformer is further configured to create a second array of the second database, and iteratively, for each array of the plurality of arrays of the first database:

read an element at a second position of said array, and write the element at the second position to a next position of the second array of the second database.

9. The system of claim 8, wherein the transformer is further configured to advance a pointer from a first position, corresponding to the first position of the first array of the first database, to a second position, corresponding to the second position of the first array of the first database.

10. The system of claim 7, wherein the transformer is further configured to reserve a region of the second memory device to contain each element copied from the first position of each array of the first database.

11. The system of claim 10, wherein the transformer is further configured to:

determine a total length of the elements in the first position of each array of the first database; and reserve the region of memory equal to at least the total length.

12. The system of claim 7, wherein the transformer is further configured to iteratively, for each array of the plurality of arrays of the first database, traverse said array to a predetermined starting position of the element.

13. The system of claim 7, wherein the transformer is further configured to provide the second database and the modified function to the target installation of the business management system.

14. A non-transitory software installation device storing processor-executable instructions configured to cause a computing device to perform automated transformation of a row-oriented syntax of a business management system to a column-oriented syntax by executing a method comprising:

identifying, by an analyzer client executed by a processor of a client device, a first database of a business management system comprising a plurality of arrays in a row-oriented syntax, each row-oriented array comprising a plurality of horizontally adjacent elements stored in corresponding adjacent contiguous data blocks in a memory of the business management system;

creating, by a transformer executed by the processor, a first array of a second database having a column-oriented syntax, each column-oriented array comprising a plurality of vertically adjacent elements stored in corresponding adjacent contiguous data blocks in the memory of the business management system;

iteratively, for each array of the plurality of arrays of the first database:

reading, by the transformer, an element at a first position of said array, writing, by the transformer, the element to a next position of the first array of the second database, wherein the element at the first position of said array of the first database is stored contiguously in memory of the business management system to a second element at an adjacent second position of said array of the first database, and wherein the element written to the next position of the first array of the second database is stored contiguously in memory of the business management system to a third element, read from a first position of a second array and written to an adjacent second position of the first array of the second database;

determining, automatically by the analyzer client and as a part of transforming the first database to the second database, a function of the business management system configured to perform data modifications includes a looped modification; and replacing, automatically by the transformer, the looped modification with a batch modification configured to perform each modification in a single step per element.

15. The software installation device of claim 14, wherein the method further comprises creating a second array of the second database; and iteratively, for each array of the plurality of arrays of the first database:

reading, by the transformer, an element at a second position of said array, and writing, by the transformer, the element at the second position to a next position of the second array of the second database.

16. The software installation device of claim 15, wherein the method further comprises advancing, by the transformer, a pointer from a first position, corresponding to the first position of the first array of the first database, to a second position, corresponding to the second position of the first array of the first database.

17. The software installation device of claim 14, wherein creating the first array of the second database further comprises reserving a segment of memory to contain each element copied from the first position of each array of the first database.

18. The software installation device of claim 17, wherein the method further comprises:

determining a total length of the elements in the first position of each array of the first database; and reserving a segment of memory equal to at least the total length.

19. The software installation device of claim 14, wherein iteratively, for each array of the plurality of arrays of the first database, reading an element at a first position of said array further comprises traversing said array to a predetermined starting position of the element.

20. The software installation device of claim 14, wherein the method further comprises providing the second database and the modified function to the target installation of the business management system.

* * * * *